(12) United States Patent
Trotter

(10) Patent No.: US 8,387,870 B2
(45) Date of Patent: Mar. 5, 2013

(54) METHODS AND SYSTEMS FOR FABRICATING A TRANSACTION CARD INCORPORATING A MEMORY

(75) Inventor: Douglas H. Trotter, Baltimore, MD (US)

(73) Assignee: Secure Exchange Solutions, LLC, Glen Burnie, MD (US)

(*) Notice: Subject to any disclaimer, the term of this patent is extended or adjusted under 35 U.S.C. 154(b) by 324 days.

(21) Appl. No.: 12/688,258

(22) Filed: Jan. 15, 2010

(65) Prior Publication Data

US 2010/0181380 A1 Jul. 22, 2010

Related U.S. Application Data

(60) Provisional application No. 61/205,201, filed on Jan. 16, 2009.

(51) Int. Cl.
*G06K 5/00* (2006.01)
(52) U.S. Cl. .......... 235/380; 235/487; 235/488
(58) Field of Classification Search .......... 235/487, 235/488, 380
See application file for complete search history.

(56) References Cited

U.S. PATENT DOCUMENTS

| | | | |
|---|---|---|---|
| 2,819,196 A * | 1/1958 | Munro | 156/234 |
| 5,644,752 A | 7/1997 | Cohen et al. | |
| 6,779,733 B2 * | 8/2004 | Akita et al. | 235/492 |
| 6,981,152 B2 | 12/2005 | Du et al. | |
| 7,139,914 B2 | 11/2006 | Arnouse | |
| 2005/0072849 A1 * | 4/2005 | Jones | 235/487 |
| 2008/0052127 A1 | 2/2008 | Rosenfeld et al. | |
| 2008/0077446 A1 | 3/2008 | Korpman et al. | |
| 2008/0127310 A1 | 5/2008 | Robbins et al. | |
| 2008/0183504 A1 | 7/2008 | Highley | |

OTHER PUBLICATIONS

International Search Report and Written Opinion of PCT/US09/53603; Sep. 21, 2009; 16 pages.

* cited by examiner

*Primary Examiner* — Karl D. Frech
(74) *Attorney, Agent, or Firm* — Armstrong Teasdale, LLP

(57) ABSTRACT

A secure card is described that includes a front surface, a back surface, a memory operably placed between the surfaces, the memory having an interface to an external device, a removable image transfer film having a releasable coating disbursed thereon, at least one digitally created image originally applied to the releasable coating in reverse image format, and an adhesive layer. The adhesive layer is operable such that the at least one digitally created image is between the releasable coating and the adhesive layer. The adhesive layer is applied adjacent one or more target surfaces associated with at least one of the surfaces, a selective release transfer process utilized such that the portions of the adhesive layer adjacent the at least one digitally created image remain on the surfaces when the image transfer film is removed from the card.

24 Claims, 16 Drawing Sheets

FIG. 6

| Data Category | Policy Rule | Kim Klein | Andrea Austin | Bryan Bell | Carol Camp | Danielle DeFoe | Francis Field | Eric Everest | George Geld | Henry Hill | Ivy Indra | James Juke |
|---|---|---|---|---|---|---|---|---|---|---|---|---|
| | | Patient #001 | Primary Care Physician | Policy Administrator | ER Admitting Registrar | ER Triage Nurse | ER Doctor | ER Patient Registrar | Hospital Radiology Tech | Hospital Radiologist | Resident Psychiatric Doctor | ER Psychiatric Discharge Coordinator |
| Personal Information<br>• One record<br>• Can be modified | Change Policy | NO | YES | YES | NO | NO | NO | NO | NO | NO | NO | NO |
| | Copy/Paste | NO | YES | YES | YES | YES | YES | YES | YES | YES | YES | YES |
| | Modify | NO | YES | YES | NO | NO | NO | NO | NO | NO | NO | NO |
| | Print | YES | YES | YES | YES | YES | YES | YES | YES | YES | YES | YES |
| | View | YES | YES | YES | YES | YES | YES | YES | YES | YES | YES | YES |
| | Set Data Range | NO | YES | YES | NO | NO | NO | NO | NO | NO | NO | NO |
| Medical Information<br>• One record<br>• Can be modified | Change Policy | NO | YES | YES | NO | NO | NO | NO | NO | NO | NO | NO |
| | Copy/Paste | NO | YES | YES | NO | YES | YES | YES | YES | YES | YES | YES |
| | Modify | NO | NO | YES | NO | NO | NO | NO | NO | NO | NO | NO |
| | Print | YES | YES | YES | NO | YES | YES | YES | YES | YES | YES | YES |
| | View | YES | YES | YES | NO | YES | YES | YES | YES | YES | YES | YES |
| | Set Data Range | NO | YES | YES | NO | NO | NO | NO | NO | NO | YES | NO |
| Restricted Medical Information<br>• One/Many records<br>• Cannot be modified | Change Policy | NO | NO | YES | NO | NO | NO | NO | NO | NO | NO | NO |
| | Copy/Paste | NO | NO | YES | NO | NO | NO | NO | NO | NO | YES | NO |
| | Modify | NO | NO | YES | NO | NO | NO | NO | NO | NO | NO | NO |
| | Print | NO | YES | YES | NO | YES | YES | NO | NO | NO | YES | NO |
| | View | NO | YES | YES | NO | YES | YES | NO | NO | NO | YES | NO |
| | Set Data Range | NO | YES | YES | NO | NO | NO | NO | NO | NO | YES | NO |
| Medical Record<br>• One/Many records<br>• Cannot be modified | Change Policy | NO | NO | YES | NO | NO | NO | NO | NO | NO | NO | NO |
| | Copy/Paste | NO | YES | YES | NO | YES | YES | YES | NO | YES | YES | YES |
| | Modify | NO | NO | NO | NO | NO | NO | NO | NO | NO | NO | NO |
| | Print | YES | YES | YES | NO | YES | YES | YES | NO | YES | YES | YES |
| | View | NO | YES | YES | NO | YES | YES | YES | NO | YES | YES | YES |
| | Set Data Range | NO | YES | YES | NO | NO | NO | NO | NO | NO | NO | NO |
| MEMBER OF GROUP | | A | B | C | D | E | E | F | F | E | G | E |

METHODS AND SYSTEMS FOR FABRICATING A TRANSACTION CARD INCORPORATING A MEMORY

CROSS REFERENCE TO RELATED APPLICATIONS

This application claims the benefit of U.S. Provisional Patent Application Ser. No. 61/205,201, filed Jan. 16, 2009, titled "Secure USB Business Card", which is hereby incorporated by reference in its entirety.

BACKGROUND OF THE INVENTION

The present invention relates to flash memory storage devices and, more particularly, to a USB card adapted for use as a business or ID card with robust exterior graphics and print indicia imparted by a novel thermal transfer, and further adapted for distributed digital information protection and control such as, for example, medical and other providers that employs a patient-carried data card with large-capacity record storage, ensuring confidentiality by allowing others to have access to the patient's selective records via computer, in accordance with a hierarchical permissions policy.

A wide variety of memory cards now exist each with different capacities, access speeds, formats, interfaces, and connectors. Most of these are relegated to particular form factors and are not compatible with credit card applications. However, smart cards are widely used as financial transaction credit cards, security access cards, electronic toll collection cards, debit cards, and the like. Smart card technology allows data to be stored in a memory element included in a smart card contact conforming to the ISO 7816 smart card standard.

For example, U.S. Pat. No. 5,832,488 by Eberhardt issued Nov. 3, 1998 shows a computer system and method for storing medical histories using a smartcard to store data. The smartcard is convenient, about the size of a credit card, and any new medical data about the individual is simply added to the smartcard. Each time the patient visits a provider, the entire medical history of the individual can be easily retrieved. The smartcard makes it possible for an individual's medical history to be "read" by a computer, displayed on the computer's monitor, printed, or transmitted. When the individual is examined by a physician all observations are added. This allows individuals to carry on their person a complete and consolidated medical history of themselves. However, the memory element of conventional smart cards stores only a small amount of data, and the smartcard is unsuitable for large records such as radiography image files. In addition, privacy is maintained simply by encrypting the patient identifier to preclude unauthorized persons from accessing a given person's medical history. The patent fails to suggest any scheme to maintain passwords or other authorization to access the data, and it does not account for the needs of the various attending physicians, residents, nurses, etc., all who may have differing rights to view and/or change the medical history Flash memory is an alternative non-volatile computer memory that can be electrically erased and reprogrammed. It is a technology that is primarily used in USB flash drives and uses a specific type of EEPROM (Electrically Erasable Programmable Read-Only Memory) that is erased and programmed in large blocks. However, conventional flash memory cards require a specialized adapter or reader, such as Universal Serial Bus (USB) or USB2. Thus, to maximize on-board memory manufacturers are clearly working hard to integrate the connector/interface in a credit card form factor. SanDisk is perhaps the most aggressive, with many credit card form factor flash memory cards.

For example, United States Patent Application 20060278723 to Raz et al. (mSystems Ltd) published Dec. 14, 2006 shows a USB card device with integral USB contacts such that, when flexed, bent or folded in, the inherent resilience of the card material provides a force for pressing the set of contacts against the electrical contacts of a USB receptacle.

PCT Patent Application Publication No. WO 2005/124932 to Atsmon et al. discloses numerous rectangular credit-card-type ID devices with USB plug projecting connectors.

U.S. Pat. No. 6,883,718 to Le et al. (Imation) issued Apr. 26, 2005 shows a credit card memory card with USS host connector protruding from the card for direct coupling of the memory card to a computer. The drawings show one corner of the card configured as a protruding USB connector.

U.S. Pat. No. 7,344,072 to Gonzalez et al. (SanDisk) issued Mar. 18, 2008 shows a credit card flash memory card with a pivoting USB connector that can easily be plugged into a host computing device.

U.S. Pat. No. 7,381,076 by Bychkov et al. (SanDisk) issued Jun. 3, 2008 shows a credit card smart card with USB connector in a pull-out plug arrangement. The plug arrangement includes a first plug portion including a plurality of electric contacts and a second plug portion. At least part of the plug arrangement is selectively displaceable relative to a remainder of the body, and upon pulling out the plug opens into first and second plug portions having sufficient thickness to mate with the electrical connector.

United States Patent Application 20030155425 by Lynch, Jeffrey Thomas published Aug. 21, 2003 shows a smart card (10) with both flash and CD, DVD or like storage. United States Patent Application 20060180674 by Margalit et al. (Aladdin Knowledge Systems Ltd.) published Aug. 17, 2006 shows a smart card with USB connector and biometric sensor such as a fingerprint reader for sampling a fingerprint of a user for authenticating the user.

United States Patent Application 20040129787 by Saito et al. (IVI Smart Technologies, inc) published Jul. 8, 2004 shows a secure smart card with biometric verification and an integral Global Positioning Satellite ("GPS") receiver 212 which can provide useful information about the current location of the reader and card at or about the time a particular transaction is taking place. In particular, the location data from GPS receiver 212 may be used to disable (either permanently or temporarily) the reader and/or the card in the event either is removed to a location at which their use is not authorized.

Flash memory devices are not traditionally used as business or ID cards. This is in part due to inherent problems with the form factor, problems with imprinting lasting text and graphics, and problems with security of data resident in the card.

One effort to solve the form factor and security problems is U.S. Pat. No. 7,334,725 to Dan (San Disk) issued Feb. 26, 2008, which shows a flash memory business card with two opposing slits defining a bendable portion within the housing that includes the connecting mechanism. The scope of the invention also suggests configuring the non-volatile memory to allow only an authorized party to access personal information stored in the nonvolatile memory, but fails to extrapolate how.

Data security is a perilous proposition in some contexts, where laws or policies impose strict confidentiality requirements on some shared information. For example, in the medical context doctors and health care providers need a reliable and secure approach to assembling comprehensive patient records from distributed sources. The sources may include multiple provider facilities (clinics and hospitals each of which maintains their own patient database, and cache database changing each time the provider is visited by a particular patient. Outright sharing of the data is difficult due to the security requirements imposed by the Health Insurance Portability and Accountability Act (HIPPA). Consequently, there is a great need for a reliable method of consolidating and processing an individual's data amongst diverse provider networks that can assemble relevant patient information despite the diversity in their classification and/or coding, and which will not compromise the requisite confidentiality of the patient.

Generally, access to information can be controlled in any number of ways, for example, by passwords, authentication tokens, a server-based authentication certification system, or any combination of the foregoing. However, with conventional techniques, once access to a file is granted to a user, the access to the information contained in file is virtually without limit. The user can, for example, modify the file, copy the file, display the file, print the file, e-mail the file, and/or transfer the file to another information system via a network. After the file is distributed outside of the immediate control, security for the distributed file is left to the discretion of those who obtain a copy.

It would, therefore, be greatly advantageous to provide a secure USB business and/or personal ID card that employs a large-capacity personal record store, a robust security framework for maintaining confidentiality by allowing others to have access at a remote location to the full set of records via computer, in accordance with a hierarchical permissions policy, all with a true business card form factor emblazoned with robust and vivid color text and graphics.

BRIEF DESCRIPTION OF THE INVENTION

In one aspect, a secure card is provided. The card includes a front surface, a back surface, a memory operably placed between the surfaces including an interface to an external device, a removable image transfer film having a releasable coating disbursed thereon, at least one digitally created image originally applied to the releasable coating in reverse image format, and an adhesive layer. The adhesive layer is operable such that the digitally created images are between the releasable coating and the adhesive layer. The adhesive layer is applied adjacent one or more target surfaces associated with at least one of the surfaces and a selective release transfer process is utilized such that the portions of the adhesive layer adjacent the at least one digitally created image remain on the surfaces when the image transfer film is removed from the card.

In another aspect, a method for applying images to transaction-type cards is provided. The method includes coating one side of a disposable base transfer film with a releasable coating, digitally printing one or more images onto the base transfer film in reverse-image format, applying an adhesive coating over the base transfer film, including over the images, indexing the base transfer film over at least one of the transaction-type cards, applying at least one of pressure and heat to the base transfer film to adhere portions of the adhesive, including the portions adjacent the one or more images, to the transaction-type cards, and peeling the base transfer film from the transaction-type cards leaving the one or more images on a surface of the card.

In still another aspect, a method for preparing a transfer film is provided. The method includes coating a plastic web in roll form with a release layer that includes at least one of a releasing lacquer, a wax, and a release coating custom mixed to create a correct release factor, creating a digital image file in a CMYK raster image file using computer drawing software, printing the image onto the release layer, laying on colors in registration patterns in the order black, magenta, cyan, yellow, and white to create a reverse image, applying an adhesive over both the reverse image and the areas of the release layer that do not contain the image resulting an a transfer, applying the transfer to a surface, and causing the image to transfer from the plastic web to the surface using a selective release process.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 6 is an exemplary policy data table.

DETAILED DESCRIPTION OF THE INVENTION

The described embodiments are directed to a secure USB business and/or personal ID card system (inclusive of the card itself, fabrication, security software and architecture) for allowing individuals such as patients, clients, etc., to carry voluminous confidential records in his or her pocket, without risking tampering or invasion of privacy, and for allowing others to have access at a remote location to a full set of records via computer, in accordance with a hierarchical permissions policy. The system is herein disclosed in the context of a Trusted Medical Record system to enable patients to carry their medical records on a business-card-sized flash memory that is shaped and adorned like a business card. However the secure USB business/ID card system can also be utilized in other applications, such as: financial services cards, identity cards, and other portable record storage device applications.

Figure 1:
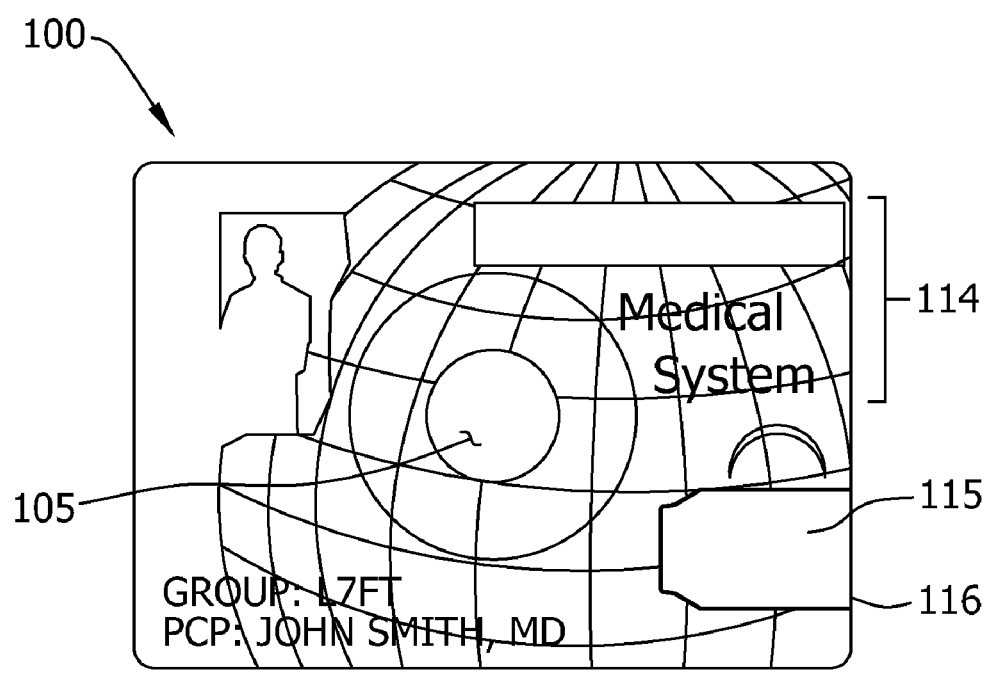
FIG. 1 is a front view of a data card.
Figure 2A:
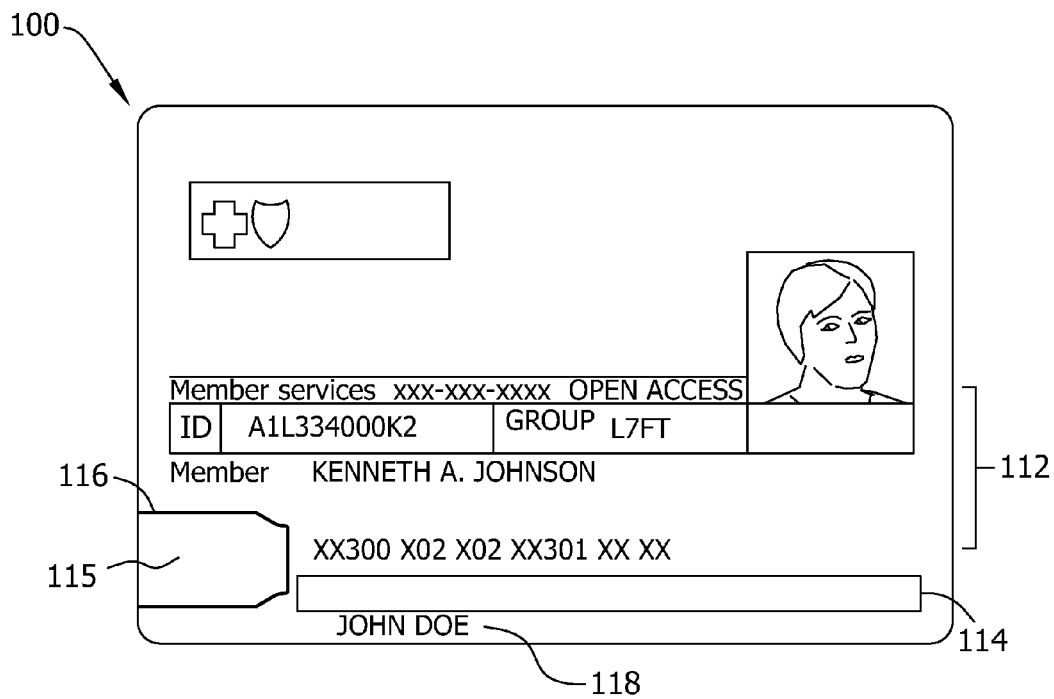
FIG. 2A is a back view of the data card of FIG. 1.

FIGS. 1 and 2A are a front view and back view, respectively, of the secure USB business/ID card 100 which is substantially the same size as a standard transaction card or identification card and may be carried in a standard wallet. The size may range from half the size of a credit card or business card and be as large as 8×8 inches, the larger formats being used as identity badges. The data card 100 is a 128 Megabyte to 1 Terabyte wallet-sized Flash memory device which can have magnetic strip or bar code capability. The data card 100 is a business-card size rectangular body including a front section (FIG. 1) bearing promotional information, and rear section (FIG. 2) bearing the functional features of the disk 100. The card 100 is formed from plastic with a deployable USB plug 115. The selectively deployable USB plug 115 lies within the profile of the card 100 and is selectively extendable to provide clearance for insertion into a complementary standard connector, such as a USB socket/receptacle. When the plug functionality is no longer required, the plug arrangement may be returned to a flush non-deployed state within the thin profile of the card 100. The selective deployment of the plug arrangement is typically achieved by relative motion of the plug 115 within a channel 116. Various deployment mechanisms may be used. For example, the relative motion may be a scissor-type opening of the plug 115 relative to the plane of the card 100. Alternatively, the opening action may be by unfolding the plug 115 like a flap out of the channel 116. Still further, the relative motion may be a slide which advances the plug 115 relative to the channel 116. The plug 115 interfaces embedded electronic circuitry in the card 110 which includes a flash memory component and control circuitry on a flexible PCB.

Figure 2B:
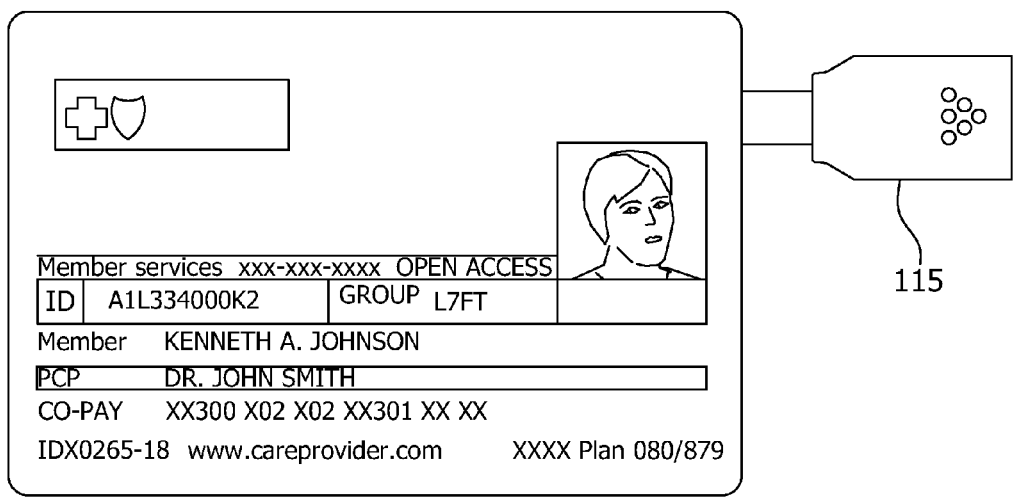
FIG. 2B is a front view of the data card with a pullout USB dongle.

FIG. 2B illustrates the USB token card embodiment with pullout USB plug 115 deployed. The plug (or dongle) 115 may be stored simply by sliding it into the alcove 116 in the card itself. The dongle 115 slides flush such that the card 100 maintains a traditional card form factor. When needed, the dongle 115 pulls out and can be plugged into any conventional computer USB port. The dongle 116 provides access to an embedded flex-film PC card with on-board memory of up to one Terabyte of data. Technology for producing PCBs sandwiched within housings of thickness less than 2 millimeters is well known in the art, and is used commercially in devices such as SD memory cards. The distal end of plug 115 carries the electrical contacts. Most PCs and similar devices contain a USB port, and can thereby read and write information to/from a USB flash memory device. Thus, the USB card 100 can be written, read, re-written or erased many times. Business-card shaped USB tokens are relatively new but commonplace. What is not common is that the present data card 100 is flexible and is capable of bearing a magnetic strip 114 or bar code on its rear. The magnetic stripe 114 contains magnetically encoded patient ID information that can be read by "swiped" current credit card or debit card verification readers at any location and transmitted to a server for authentication. The embedded flash memory contains up to one Terabyte of digital information encrypted per permission-based content control software (to be described). In addition to the magnetic stripe 114, the card 100 may include a paper strip or a specially coated strip 116 like a regular credit card to allow for a patient to sign.

As an addition or alternative to the magnetic stripe 114, the USB card 100 may be provided with a two-or three-dimensional barcode containing the same information. In this case, it is preferred that a two-or three-dimensional barcode be applied by an image transfer printed by modified large-format digital printer. The transfer is preferably applied by a selective release transfer process as set forth below.

The patient's partial medical records are stored on the USB readable portion of the memory, and the patient's complete record is stored on a central server. When the patient presents his or her Secure USB business/ID card 100, the provider's office swipes the card to authenticate the user (and preferably verifies the patient's signature), and then inserts the card in an ordinary desktop computer containing a conventional USB port. The desktop computer then asks for a password, and the user (nurse, physician, resident, or other user) will furnish their password. In one embodiment, the password is entered into the desktop computer, and in other embodiments it is entered twice for confirmation. The desktop computer sends an electronic "key" to a secure server. If the password has been recorded on the server, the key will be recognized and the secure server will respond by sending another, matching electronic key back to the desktop. When the exchange of matching keys is completed, the user will receive information that is decrypted at the individual user's permitted level of access. The verification process is completed in a matter of a few seconds. It should be apparent that the card 100 offers four security measures: 1) passwords assigned locally according to local policy that must be known to gain access; 2) central server-based security where the password must be recognized according to pre-determined rules; 3) the magnetic stripe 114 is imprinted with a unique identity key to provide a third level of security; and 4) a signature block for visual authentication.

Information is "locked" at some levels of access and is open at others, based on the user's classification and assigned user-rights. Some users will be allowed to read only parts of a record. Some will be allowed to read everything. Some users will be allowed to make changes to a file. Some will be allowed to print and disseminate information. Newly entered information is encrypted and recorded to the Secure USB business/ID card 100 on the spot. When a user reads, changes, or adds to a record, the transaction is recorded and it becomes part of an electronic audit trail on the permanent record. Thus, if a user gives his or her password to an unauthorized party, that person's entry to the system will be recorded and monitored.

Figure 3:
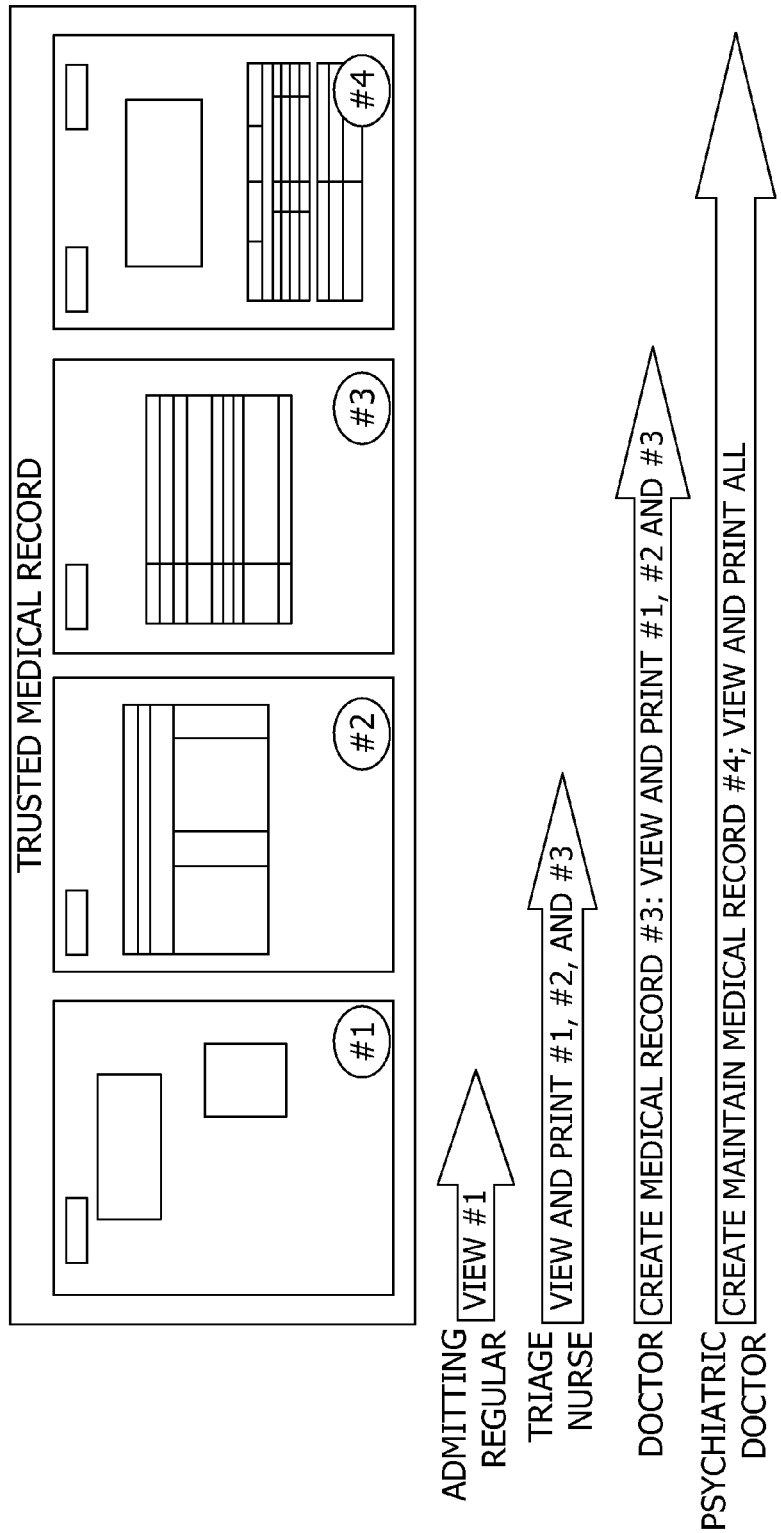
FIG. 3 is a flow chart example illustrating the hierarchical security levels of the present invention.
Figure 4:
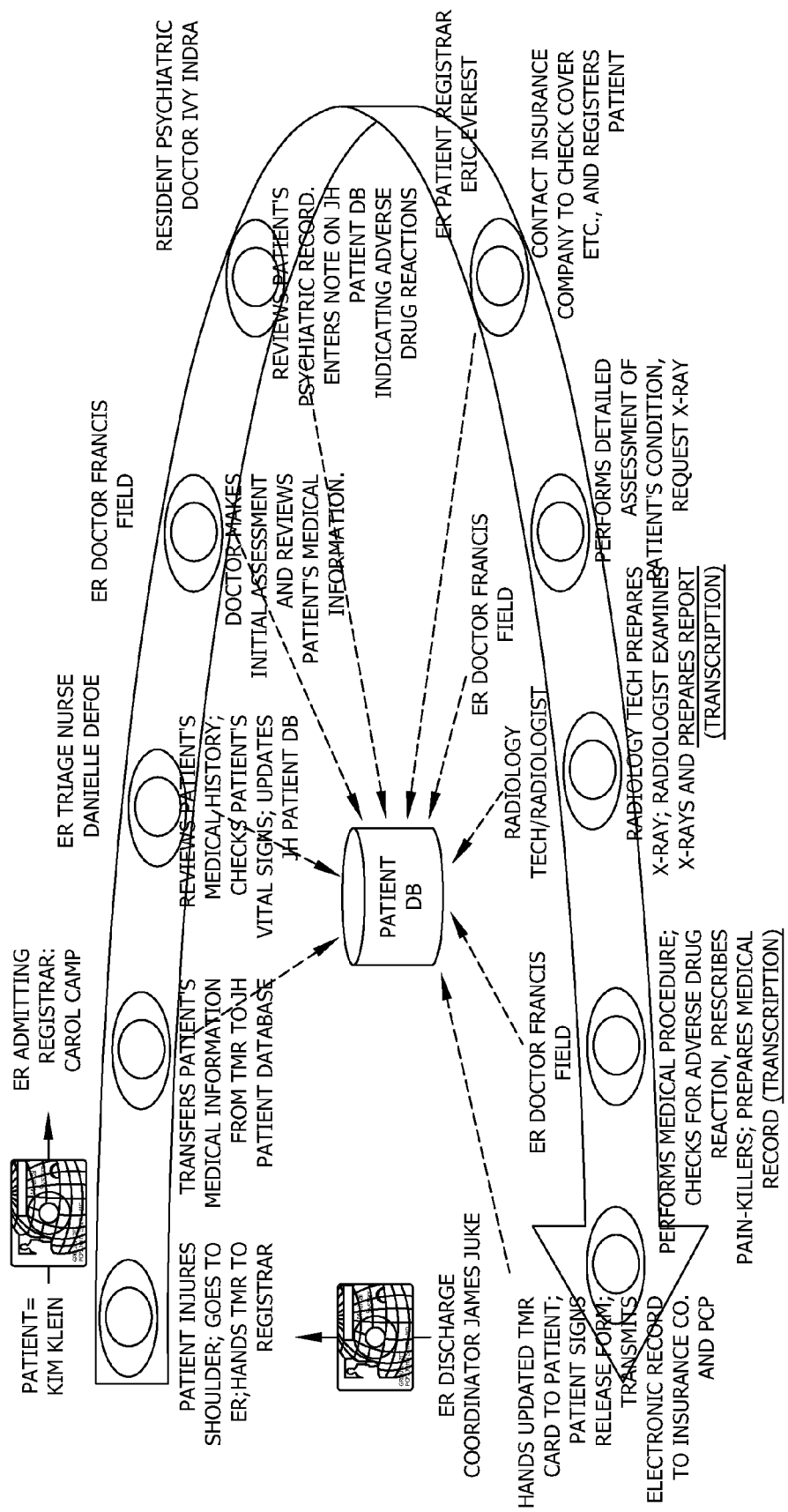
FIG. 4 is a workflow chart illustrating an example admission sequence for a patient using the Secure USB business/ID card.

FIG. 3 is a flow chart example illustrating the hierarchical security levels of the present invention. FIG. 4 is a workflow chart illustrating an example admission sequence for a patient using the Secure USB business/ID card 100. The example admission sequence will now be described with combined reference to FIGS. 3 and 4. In this example there are four different users: Admitting Registrar, Triage Nurse, Doctor, and Psychiatrist. Each of these users are permitted different levels of access to the information. Some may be allowed to read only parts of a record, some will be allowed to read everything, some users will be allowed to make changes, and some will be allowed to print and disseminate information. Specifically, the Admitting Registrar has access rights to basic patient information such as contact and insurance info. They are permitted to view data only to this extent as seen at #1. The Triage Nurse has access to basic patient information, admission history, and standard medical records as seen at #2, and has authority to view and print any of these records. The Doctor has access to basic patient information, admission history, and standard as well as restricted psychiatric medical records as seen at #3, and is free to edit, view and print any of the foregoing as shown at #3. Finally, the Psychiatrist only has access to the restricted psychiatric medical records as seen at #4, but can view and print these.

As seen in FIG. 4, patient Kim Klien goes to the emergency room with shoulder injuries. Her first stop is the Admitting Registrar, where Ms. Klien hands her data card 100 to the Registrar. The Registrar verifies the datacard by checking the signature, swiping the magnetic stripe, and inserting into a computer USB port. The Registrar then enters her own password, confirms it, and transfers the patient's complete medical records from a central server to the on-site provider database. The workflow proceeds to the Triage Nurse, Danielle DeFoe, where Ms. Klien hands her data card 100 to the Triage Nurse. The Triage Nurse again verifies the datacard by checking the signature, swiping the magnetic stripe, and inserting into a computer USB port. The Triage Nurse then enters her own password, confirms it, and proceeds to review the patient's Medical History. The Triage Nurse can access to basic patient information, admission history, and standard medical records, and has authority to view and print any of these records. The Triage Nurse completes her customary duties which include checking the patient's vital signs. This information is keyed into the computer where it updates the provider database and is immediately written to the data card 100. Ms. Klien next visits the ER Doctor Francis Field, who verifies the datacard by checking the signature, swiping the magnetic stripe, and inserting into a computer USB port. Dr. Field then enters his own password, confirms it, and makes an initial assessment and reviews the patient's medical information, Dr. Field has access to basic patient information, admission history, and standard as well as restricted psychiatric medical records, and is free to edit, view and print any of the foregoing. He is alerted to a special note on the patient's file. Ms. Klien next visits the Psychiatrist Doctor Indra Ivy, who verifies the datacard by checking the signature, swiping the magnetic stripe, and inserting into a computer USB port. Dr. Ivy then enters his own password, confirms it, and makes an initial assessment and reviews the patient's medical information. Dr. Ivy has access to the restricted psychiatric medical records and can view and print these, but not the other records. He enters a new note on the patient's file regarding adverse drug reactions. The workflow continues in this manner through to discharge, from station to station, with each attendant having only the information authority needed to complete their job properly. All along the workflow path an audit trail is being laid revealing who had what access to what data, and when.

Thousands of combinations of access policies can be set for the various users as a result of the hierarchical security software of the present invention. Additionally, the encryption process allows records to be time limited. Records can be programmed to expire or to become locked after the passage of time. Users can be required to log on to the system for updates, thereby lessening the likelihood that a Trusted Medical Record user will mistakenly rely on out of date information.

The details of both the hardware and software will now be described in full.

Hardware Architecture

Figure 5:
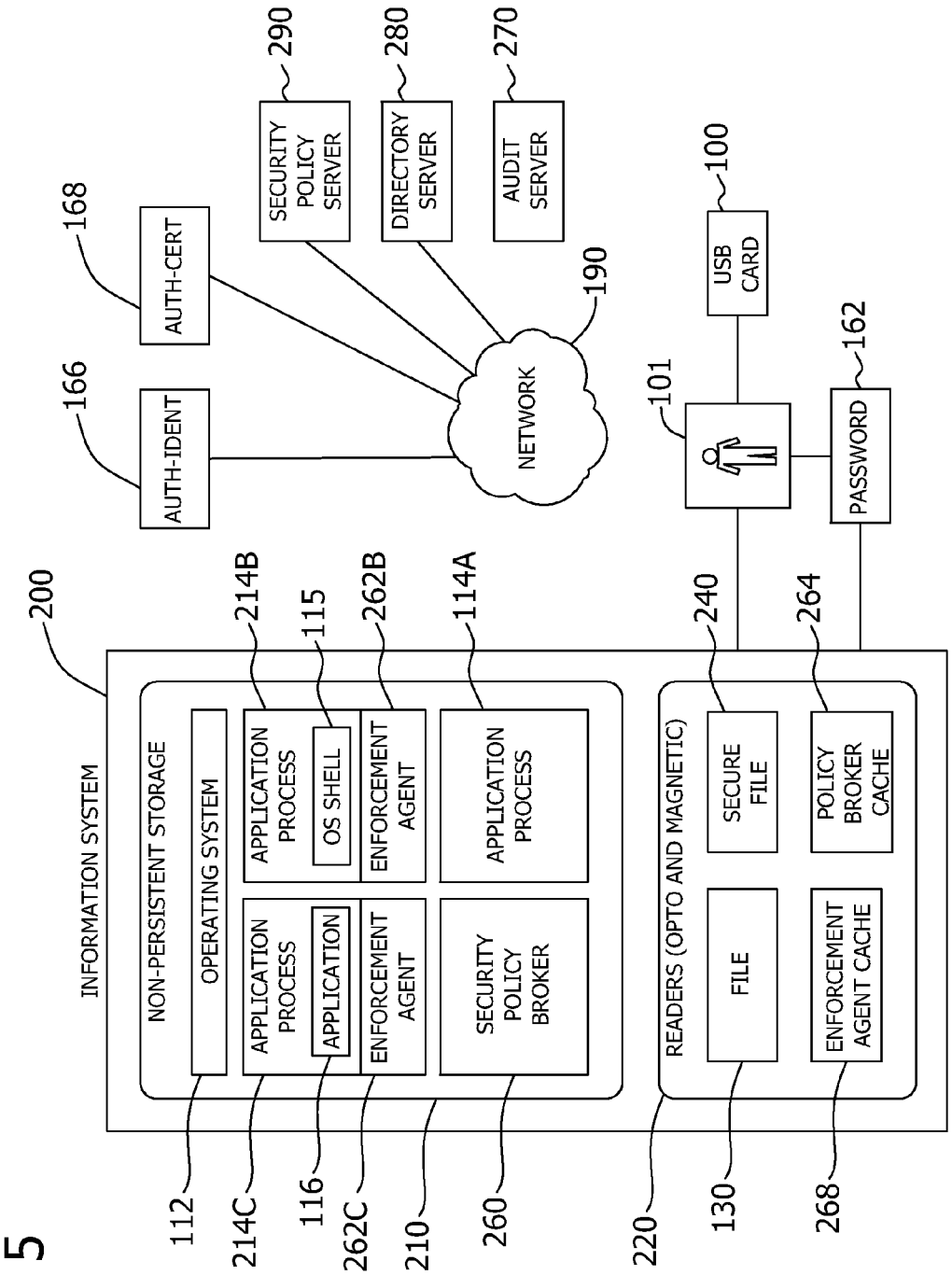
FIG. 5 illustrates the distributed information protection and control system according to the invention.

FIG. 5 illustrates the distributed information protection and control system according to the invention. The information protection system includes an information system 200 accessible by a user 101 using a Secure USB Card 100 along with their password 162 according to the present invention. The information system 200 may be embodied using any computer apparatus that accepts data, processes the data in accordance with one or more stored software programs, generates results, and typically includes input, output, storage, arithmetic, logic, and control units, inclusive of a desktop computer, notebook computer, supercomputer, mainframe, minicomputer, workstation, server or the like.

The information system 200 includes a number of standard computer components, including: non-persistent storage 210, data readers 220 (preferably a USB port plus a magnetic stripe reader), processor 140, keyboard 144, mouse 146, display 148, printer 150, adapter 152, and communications interface 154. The readers 220 retrieve persistent data storage from the data card 100 to the information system 200.

The non-persistent storage 210 comprises one or more storage devices used for volatile data storage accessible by the information system 200. Examples of the non-persistent storage 210 include: random access memory (RAM), non-volatile random access memory (N VRAM), and read-only memory (ROM).

The information system 200 preferably also includes one or more information processors (e.g., central processing units, CPU), keyboard, mouse, display and printer, and other standard computer peripherals as desired.

The information system 200 is connected to a network 190 via a communications link. The network 190 comprises a number of computers and associated devices that are connected by communication facilities. The network 190 can involve permanent connections (e.g., cables) or temporary connections (e.g., those made through telephone or other communication links). Examples of a network include: a local area network (LAN); a wide area network (WAN); a satellite link; and a combination of networks, such as an internet and an intranet. The communications link can be established using any combination of well-known communications protocols, for example: X.25, ATM, SSH, SSL, HTTP, SMTP, NetBIOS, and/or TCP/IP.

In accordance with the present invention, the network 190 is coupled to an authentication identification system 166, art authentication certification system 168, an audit server 170, a directory service 180, and a policy server 195.

The authentication identification system 166 comprises a system to authenticate the identity of the user 101 and patient to whom the data card 100 was issued. For the user 101, the authentication identification system 166 can be an authentication service-type device capable of one or more types of challenge-response authentication protocols. Examples of challenge-response authentication protocols include: username/password authentication, secret-question/secret-answer type authentication, or any other authentication techniques to verify the identity of user 101. Alternatively, the user 101 may identify themselves by means of a smartcard, a biometric reader (e.g., fingerprint reader or palm analyzer), etc. Any number of conventional authentication devices using any combination of authentication protocols may be used to augment or replace conventional username-password type authentication, as may be provided as part of the capabilities of the information system 200. For the patient, the authentication identification system 166 verifies the identity of the patient as read from the magnetic stripe (or barcode) on data card 100.

The authentication certification system 168 comprises a system to generate, certify, and/or distribute cryptographic information, including cryptographic keys, to perform authentication, signing and/or other cryptological tasks to authenticate the identity of the user 101. Conventional public key cryptosystems are known and have associated cryptographic keys that can be used to encipher and decipher information. One or more cryptographic keys can also be used to authenticate the identity of the user 101.

The audit server 170 comprises a separate information system or storage device or devices accessible via the network 190. The audit server 170 can be used for the collection, storage and analysis of auditing information obtained from one or more information systems, including any of the following exemplary systems: authentication identification 166, authentication certification 168, audit server 170, directory service 180, and policy server 195.

Within the prior-art, the audit server 170 may also be referred to as a data logger or a system log. The directory service 180 comprises a system to share public and semi-public identity information regarding user 101, as well as other known users, with those having access to network 190. Examples of the directory service 180 include: an http server, a lightweight directory access protocol (LDAP) service, a relational database management system, and a Microsoft Exchange Server. The directory service 180 can provide user-specific information, for example: personal information of the user 101, such as name, addresses, telephone numbers, and email addresses and cryptographic keys used by the user.

Referring back to the non-persistent storage 210, this includes an operating system 112, and any number of concurrently running application processes including three in particular: application process 114A is a word processor such as Microsoft Word.

The operating system may be a conventional operating system such as Microsoft Windows™ or Linux™, alone or in combination with a virtual operating system/virtual machine. A virtual operating system can host other operating systems. Similarly, a virtual machine is a programming language interpreter (such as Java Virtual Machine™ or Python™. These allow different operating systems to run on the same computer at the same time, and it prevents applications from interfering with each other. Each virtual machine is like a "machine within the machine" and functions as if it owned the entire computer. The operating systems in each virtual machine partition are called "guest operating systems," and they communicate with the hardware via a virtual machine control program called a "virtual machine monitor" (VMM). The VMM "virtualizes" the hardware for each virtual machine. With a virtual operating system/virtual machine the present software need not be dedicated to the Microsoft operating system.

A program application 116 runs within application process 214C which runs, and enforcement agent 262C is associated with application process 214C. Similarly, enforcement agent 262B is associated with application process 214B, within which OS shell application 115 runs. Generally, a command line interface or operating system shell or executive may be run as a type of application running in an application process, depicted as OS shell 115, examples of which include: "command.com" and "explorer.exe" for the Microsoft Windows operating system 112, and the "bash" for the Linux operating system 112. Examples of an application 116 running inside of application process 114C include: Microsoft Word, Adobe Acrobat Reader, Netscape Internet Browser and the GNU Image Manipulation Program.

The enforcement agent 262 (both B & C) are instances of a software program that modifies the interface between the application process and operating system kernel, and permits additional non-discretionary access controls to be enforced without requiring changes to user application programs. In FIG. 5, enforcement agent 262C is associated with application process 214C within which program application 116 runs, and enforcement agent 262B is associated with application process 214B, within which OS shell application 115 runs. Each enforcement agent 262 controls access to the contents of secure files 240 by application 116 running within application process 214. The access is controlled in accordance with a policy model that permits different classes of users different levels of access to the information, depending on predetermined authorization. For example, admission personnel will have access to insurance and selected personal information, however can only copy it to a selected file and nothing else. Nurses, pharmacists and physicians would have policies that grant higher levels of access. Individual users are granted access only to the information that they need for their specific roles in the health care process. The Trusted Medical Record system's multi-level policy capability can be custom-tailored to provide the high level of security required under the federal HIPPA laws, while allowing an extraordinary level of versatility and portability. If an unauthorized person tries to enter the system to read, copy or change a medical record, the Trusted Medical Record system disallows the action and records the intrusion in an activity log and it notifies the responsible persons automatically. At the Security Policy Server 290, the user name, password and patient identifier are matched to a system-wide policy that is designed to comply with HIPPA. The system-wide policy is maintained as a data table at the Security Policy Server 290.

FIG. 6 is an exemplary policy data table. The policy table is arranged in rows by type of record/information, such as Personal Info, Medical Information, Restricted Medical Information, Medical Records, etc. The policy table is arranged in columns by categorical status with respect to accessing the data, e.g., Patient, Primary Care Physician, ER Triage Nurse, Resident, Admitting Nurse, Radiologist, Psychiatric, etc. Defined user actions are specified in the second column, and these include View, Change Policy, Copy/paste, Modify, Print, View, Set Date Range. The security policy broker 260 implements this pre-defined policy. The security policy broker 260 interprets security policy within the context of information system 200. There may be one or more security policy brokers 260 running in information system 200. Referring back to FIG. 5, one security policy broker 260 is assigned to enforcement agents 262B and 262C, the security policy broker 260 and the enforcement agents 262 run on the same information system 200, and each enforcement agent 262 runs in different application processes 214.

In response to a query by the enforcement agent 262, the security policy broker 260 determines whether sufficient authorization exists for the enforcement agent 262 to allow the requested action or actions initiated by user 101. In other words, the enforcement agent 262 communicates with the security policy broker 260 to determine how specific user-actions should be enforced. The security policy broker 260 is also responsible for ensuring compliance with the correct security policy, whether this policy information is carried within the secure file 240, maintained in the policy broker cache 264, or retrieved from the security policy server 290.

Each enforcement agent 262 controls access to the contents of secure files 240 by application 116 running within application process 214, the enforcement agent 262 monitors, intercepts, and as needed, mitigates, the requested actions performed to and with the contents of secure files 240. The enforcement agent 262 intercepts the flow of instructions between the operating system 112 and the application program 116 running in application process 214.

This interception can be accomplished in any number of ways. For example, the interception can use one or more existing application programming interfaces (APIs) and other well-known programmatic conventions implemented by the operating system 112. Information on such interfaces and conventions can be obtained from the published documentation associated with the operating system 112 or obtained from by careful study and analysis of actual programs, or obtained using other conventional techniques.

The specific design and implementation of the enforcement agent 262 depends on the operating system 112, and includes measures to identify, detect, and as necessary, modify, the flow of instructions between the application program 116 and the kernel of the operating system 112. By way of example, the enforcement agent 262 can be implemented on a process-by-process basis for all application processes 114, or possibly as an enhancement to the programs and tools provided with the operating system 112, or possibly even as an extension to the kernel of the operating system 112. Such an extension to the kernel can, for example, be implemented using a pseudo-device driver or other loaded module of the kernel executive of the operating system 112; or by enhancing the capabilities of the existing system-wide library routines, such as glibc or kernel32.exe; or by extending the capabilities of existing command level applications, such as bash, ash, or command.com, or by modifying the attributes of each application process 114 as it is created by the operating system 112.

The secure USB Card 100 includes the data files for a patient which are read into the USB reader 220 upon insertion therein. These patient files include data files 130, secure files 240, policy broker caches 264, and enforcement agent caches 268. Each secure file 240 contains both information to be secured (e.g., from a file 130 or generated by the user 101) and additional information according to the invention to maintain its security. The contents of a secure file 240 cannot be successfully accessed without the intercession of an enforcement agent 262 and a security policy broker 260 implementing the security policy under which the security policy broker 260 was configured. For example, the secure file 240 can contain a Microsoft Word file, which can be shared with others, but whose content is accessed through the use of a Microsoft Word application running in an application process 214C associated with an enforcement agent 262C. The details of the secure file 240 are discussed below in relation to FIG. 3.

The policy broker cache 264 is used by the security policy broker 260 to retain and reuse information used to make enforcement decisions. The policy broker cache 264 can store additional information on the security policy, identity information about users of the invention, and/or other information. The policy broker cache 264 can be shared between multiple security policy brokers 260, and/or there may be one policy broker cache 264 for each security policy broker 260.

The enforcement agent cache 268 is used by the enforcement agents 262 to store any temporary information created by applications protected by the enforcement agents 262. Information in the enforcement agent cache 268 is protected from unauthorized access. Temporary information can include, for example, automated backups, automatically generated revisions, and others types of temporary files. The enforcement agent cache 268 is used to ensure that this temporary information is maintained in a protected state and that no unprotected copies of any temporary files are vulnerable to unauthorized access. The enforcement agent cache 268 may also temporarily store decrypted plaintext blocks of information otherwise contained within protected secure files 240 in an encrypted state. In other embodiments, the enforcement agent cache 268 may be shared between multiple enforcement agents 262, and/or there may be one enforcement agent cache 268 for each enforcement agent 262.

The policy broker cache 264 and/or the enforcement agent cache 268 can include a time-to-live (TTL) interval, where the cached information remains authoritative for a specified interval of time. After the time-to-live interval ends, the cached information expires. The TTL interval may vary according to the specific security policy in place, and indeed, different TTL values may be used with different users, for different files, and/or with different information systems.

With regard to FIG. 5, and in addition to the prior art connections via the network 190, the information system is connected via the network 190 to an audit server 270, a directory service 280, and a security policy server 290. The audit server 270 receives the detailed event data from the enforcement agents 262 and the security policy brokers 260 of various information systems coupled to the audit server 270 via network 190. This event data indicates what users attempted what actions under what conditions, along with other security related information collected by enforcement agents 262 and security policy brokers 260. The collection of these events can be directed by the security policy. In various embodiments of the invention, there may be one audit server 270, multiple audit servers 270, or no audit servers 270. In the case of no audit server 270, all information that would otherwise be sent to an audit server 270 may be stored in information system 200.

The directory service 280 contains additional information associated with users required for the operation of the information systems utilizing the current invention. Such additional information includes, for example: identity records 510 (see below) and other configuration data for the enforcement agents 262 and security policy brokers 260 specific to users 101 of the invention. In various embodiments of the invention, there may be one directory service 280, multiple directory service 280, or no directory service 280. In the case of no directory service 280, all information that would otherwise be sent to a directory service 280 may be stored in information system 200.

The security policy server 290 provides updates to the security policy broker 260 on the security policy for the information system 200. Depending on the security policies of a given organization and the privileges of the user 101, the information system 200 may be permitted to function for periods of time without a connection to the security policy server 290, depending on information stored with the policy broker cache 264 and enforcement agent cache 268. If such disconnected operation is permitted, the actions of the user 101 can be further restricted while the information system 200 is in a disconnected state. In addition to the initial activation of the information system 200, the information system 200 at other times can access the security policy server 290 for additional security policy information. For example, the information system 200 can access the security policy server 290 periodically, non-periodically, and/or in response to rules established in the security policy itself. In various embodiments of the invention, there may be one security policy server 290, multiple security policy servers 290, or no security policy servers 290. In the case of no security policy server 290, all information that would otherwise be sent to a security policy server 290 may be stored in information system 200.

The security policy obtained from the security policy server 290 may be specific to a given person, a particular information system, or both. Such person-specific information can include, for example: authentication-related credentials (e.g., passwords, cryptography keys, biometric attributes, and authentication tokens); and references to various authenticated-related information located elsewhere via the network 190 (e.g., passwords, cryptography keys, biometric attributes, and authentication tokens). The security policy information obtained from the security policy server 290 can be stored for an indefinite period of time in the policy broker cache 264, a defined period of time in the policy broker cache 264 before needing refreshment by the security policy server 290, or retrieved from the security policy server 290 each time it is required.

In other embodiments, the security policy broker 260 can obtain authentication related information from the security policy server 290, the authentication identification system 166, authentication certification system 168, and/or the directory service 280. The security policy broker 260 can also make use of authentication mechanisms provided in the operating system 112.

Figure 7:
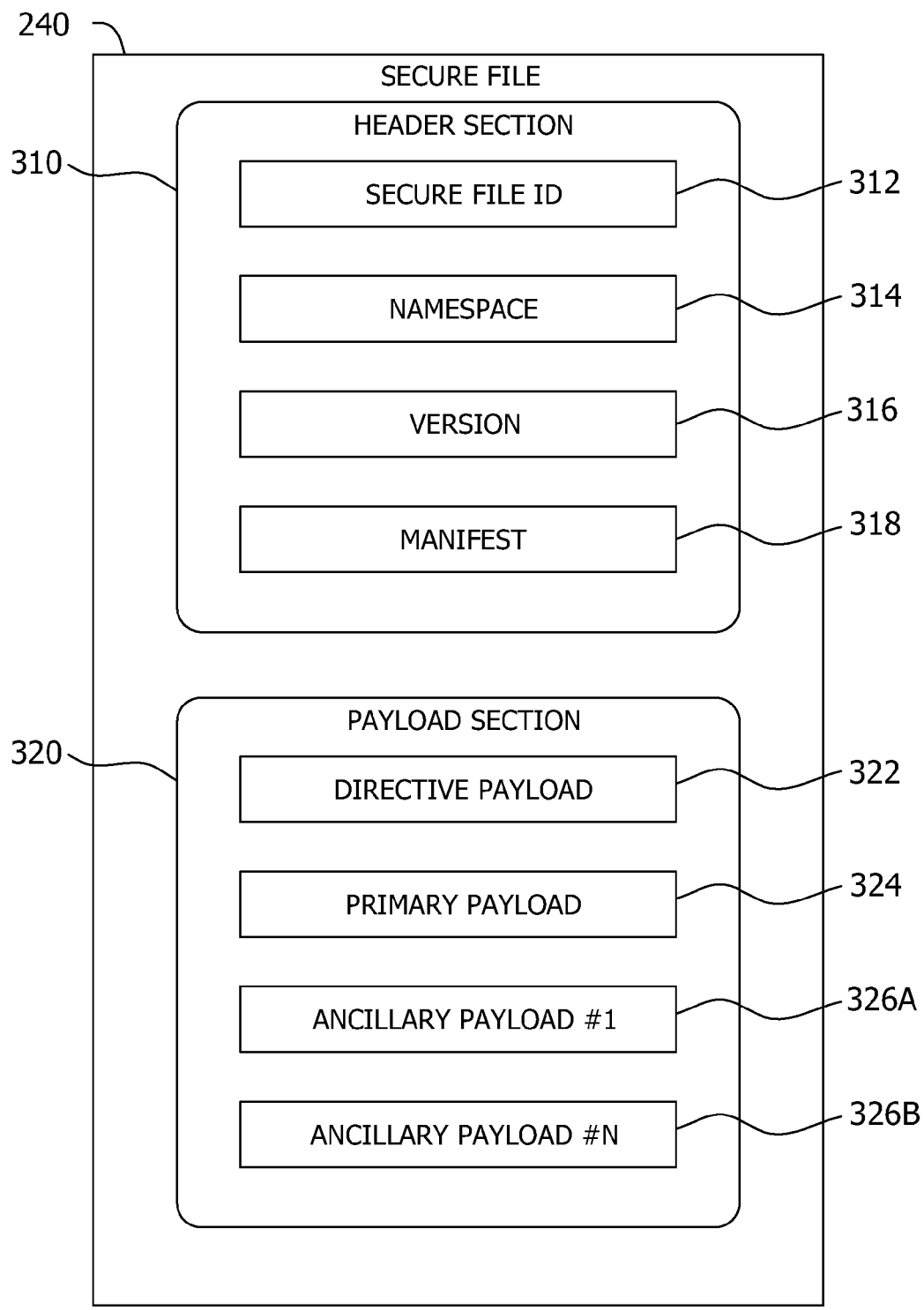
FIG. 7 illustrates a secure file of the distributed information protection and control system of FIG. 5.

FIG. 7 illustrates a secure file 240 of the distributed information protection and control system of FIG. 5. The secure file 240 includes a header section 310 and a payload section 320. Conceptually, the secure file 240 can be considered a container in which files 130 are placed for safekeeping, where the header section 310 contains the information describing how the secure tile 240 is assembled and the payload section 320 contains the actual information being protected.

The header section 310 includes secure file identification 312, a security policy namespace 314, a version 316, and a manifest 318. The secure file identification 312 includes a quasi-unique identifier to identify the secure file 240 without relying upon any operating system specific attributes (e.g., file name). Conventional techniques to generate a quasi-unique identifier include, for example: generating a sufficiently large pseudo random number which may be used as a quasi-unique identifier; issuing sequentially numbered identifiers from some agreed upon location; and generating identifiers in a relational database.

The security policy namespace 314 includes an identifier specific to the security policy under which the secure file 240 is being managed. Conventional techniques to assign such an identifier include, for example: using the fully qualified domain name of security policy server 290, expressed as a string of ASCII characters; and the distinguished name (DN) of an LDAP entry within the directory service 280. The version 316 identifies the revision level of the format for the secure file 240.

Conventional techniques to identify the revision level include, for example: a pair of numerical values expressing a major and minor revision number; and the URL of a formal extensible markup language (XML) data type definition (DTD) describing the format of the secure file 240.

The manifest 318 provides details of the payload section 320 and includes one or more manifest records 330 (illustrated in FIG. 6), where each manifest record 330 further describes a payload 340 present in the payload section 320. Each manifest record 330 in the manifest 318 corresponds to a specific payload 340 in payload section 320. For the exemplary secure file 240 in FIG. 5, the manifest 318 includes four manifest records 330, where the first manifest record 330 corresponds to the directive payload 322, the second manifest record 330 corresponds to the primary payload 324, the third manifest record 330 corresponds to the ancillary payload 326A, and the fourth manifest record 330 corresponds to the ancillary payload 326B.

Figure 8:
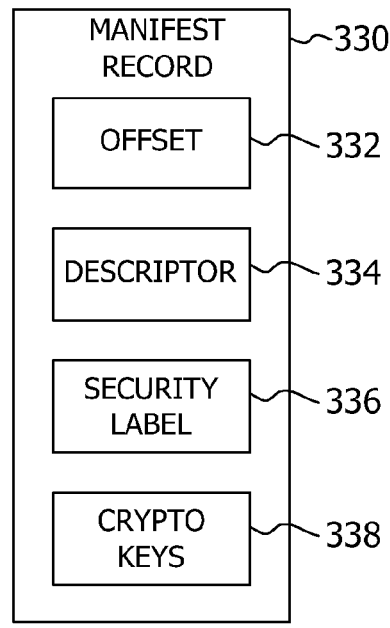
FIG. 8 illustrates a manifest record.

FIG. 8 illustrates a manifest record 330. There is one manifest record 330 for each payload 340 in the payload section 320 of a secure file 240. Each manifest record 330 includes an offset 332, a descriptor 334, a security label 336, and one or more crypto keys 338.

The offset 332 includes offset pointers and other bookkeeping attributes useful for randomly accessing individual blocks of information the payload section 320 associated with the manifest record 330. Information maintained within offset 332 may be advantageously used with information maintained within the crypto-keys 338, thus permitting this same random access to encrypted payloads 340 in the payload section 320.

The descriptor 334 is used to at least differentiate between different types of payloads 340 in the payload section 320 (e.g., a directive payload 322, a primary payload 324, and an ancillary payload 326A, 3268), and may also include additional descriptive information specific to the payload 340. The descriptor 334 can include, for example, the same types of file-type information that are conventionally associated with files, or other types of file-system specific information were associated in the file 130 from which the payload 340 originated at the time when the secure file 240 was created. Such file-type information can include, for example: a file name, a file extension type, a creation date, size of the file, and a character encoding method (e.g., unicode, utf/8, iso latin 1).

The security label 336 includes an encoded representation of a security label 460 (in FIG. 10) associated with the corresponding payload 340 in the payload section 320. The security label 336 can be cryptographically protected (e.g., digitally signed and/or encrypted). The crypto keys 338 include the cryptographic information used to encrypt the secure file 240. Examples of information contained in the crypto keys 338 include: cipher modes, cipherkeys, public keys, private keys, and PKI certificates. In various embodiments, some or all of the cryptographic information may be advantageously stored in other locations (e.g., a smartcard or FIPS-140 type device connected to information system 200), and the crypto keys 338 contain one or more pointers or references to this remotely stored information. Crypto keys 338 may themselves also be encrypted and protected, using any number of conventional ways used to protect similar types of cryptographic information.

A frequent problem associated with many prior art cryptographic implementations is the requirement to decrypt the entire ciphertext of a file in order to access just a small section of the plaintext. Just as most operating systems permit quasi-random access to a block within a given file, the invention advantageously provides a technique for the enforcement agent 262 to access and decipher any arbitrary payload block (e.g., 341, 342, 343, 344, or 349) of a payload 340 in the payload section 320 that may be encrypted. More specifically, the present invention permits the use of blocks cipher modes that allow cryptographic operations to be performed on arbitrary blocks within a secure file 240, thus permitting random-access cryptologic operations to the underlying cleartext in each payload 340 within payload section 320. This capability is the so-called random-access property associated with some block cipher modes. For example, cipher block chaining mode (CBC) ciphers permit parallelizable decryption, thus permitting random-access read operations to a file, and electronic code book (ECB) mode ciphers permit parallelizable encryption and decryption, thus permitting random-access read and write operations to a file.

Referring back to FIG. 7, the payload section 320 includes zero or more directive payloads 322, a primary payload 324, and zero or more ancillary payloads 326 (illustrated as ancillary payload #1 326A, . . . , ancillary payload #N 326B).

Figure 10:
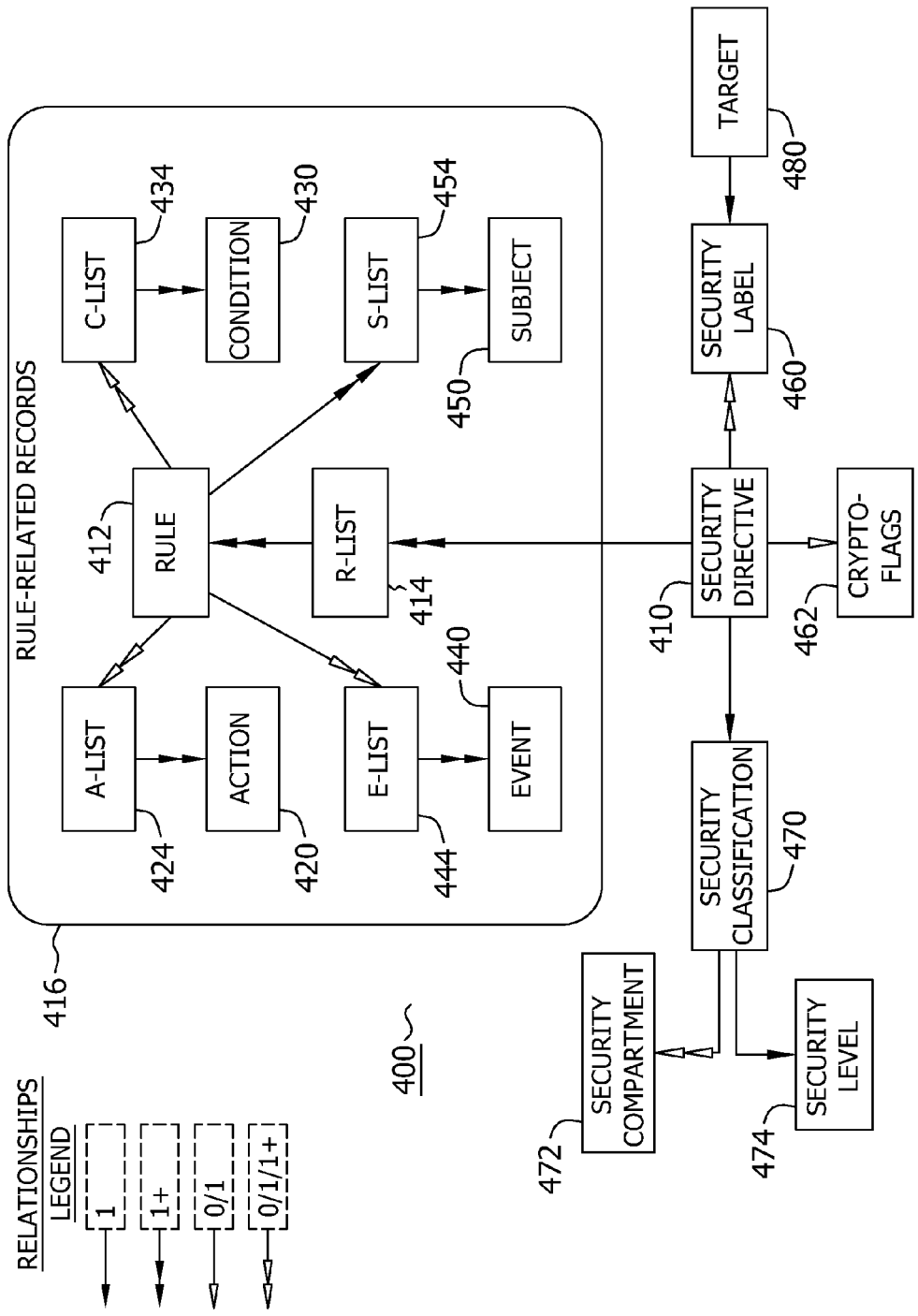
FIG. 10 illustrates a security directive of the invention.

The directive payload 322 can include a security directive record 410 (FIG. 10) associated with a security label 460 (FIG. 10). The security label 460 can be, but need not be, the security label 336 associated with the manifest record 330 of payload 340. The directive payload 322 can be cryptographically protected. To facilitate the enforcement of the security policy, the enforcement agent 262 provides the contents of the directive payload 322 to the security policy broker 260. The security policy broker 260 can obtain information directly from other authoritative sources (for example, the security policy server 290 and/or the directory service 280) to ascertain if the directive payload 322 remains current, and to verify the accuracy of any digital signature(s) associated with directive payload 332, if present. The payload section 320 can include multiple directive payloads 322 in various embodiments, for example: one directive payload 332 for primary payload 324 and all ancillary payloads 326; one directive payload 332 corresponding to each primary payload 324 and ancillary payload 326; and zero or more directive payloads 332 corresponding to one or more primary payloads 324 and any ancillary payloads 326.

The primary payload 324 contains the exact same information contained in file 130 to be protected and controlled. The primary payload 324 can also contain information generated by the user to be protected and controlled. The primary payload 324, as with the directive payload 322 and ancillary payloads 326, may be cryptographically protected (e.g., digitally signed and/or encrypted).

The ancillary payloads 326 contain other types of information associated with the file 130, or other information, to be protected and controlled. Each ancillary payload 326 is composed of an ordered sequence of bytes, characters, or other atomic elements of storage in a fashion similar to that of the primary payload 324 and utilizes the same storage semantics dictated by the underlying file system. Ancillary payloads 326 can also be used to distribute the information to be protected across multiple payloads, thus permitting different security directives to be associated with different sections of the secure file 240. For example, if a file 130 to be protected is composed of both text and images, the text can be placed in the primary payload 324 and assigned one security label 336, and the images can be placed in one or more ancillary payloads 326 and assigned the same and/or other security labels 336. By way of example, this flexibility permits the invention to protect the contents of a complex HTML file composed of multiple MIME blocks by distributing each of the MIME blocks into their own ancillary payloads 326 within the secure file 240.

Advantageously, this capability could also be used to apply security labels 336 and security directives to elements of information more granular than that of an entire file 130, allowing each element to be protected and controlled differently. Examples of such information elements include subsections of files, linked or embedded objects within a file, storage allocation within databases (e.g., tables, rows, columns, and cells), or any other addressable element of digital or digitized information. This capability permits, for example, having a single version of a file, but different users having different views of it, based on which elements they were authorized to access.

Figure 9:
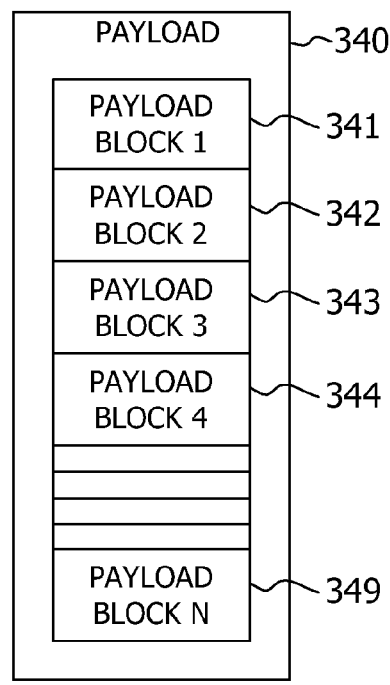
FIG. 9 illustrates a typical payload.

FIG. 9 illustrates a typical payload 340 (e.g., a directive payload 322, a primary payload 324, or an ancillary payload 326) in the payload section 320. Each payload 340 is an ordered set of logical blocks. For example, the payload 340 includes payload block 1 341, payload block 2 342, payload block 3 343, payload block 4 344, and payload block N 349 as the last logical block.

To ensure ongoing compliance with the security directives associated with the contents of secure file 240, it is important that the information contained within the secure file 240 cannot be accessed through some means other than via the enforcement agent 260 and security policy broker 262. However, it is still possible to use other programs and utilities to act upon the secure file 240 as a whole, without explicitly taking action on its contents. For example, secure files 240 may be backed up to archival media, copied to floppy diskettes, and/or distributed by email.

The invention uses cryptography to maintain the confidentiality and integrity of the information within secure files 240, while still permitting these secure files 240 to be handled by the operating system 112. Thus, while a user may still use any "discretionary" abilities afforded to them by their information system 200 and distribute secure files 240 to others, the information within these secure files 240 still remains sacrosanct and the ciphertext within cannot be successfully be decrypted without proper authorization. Further still, since proper authorization and decryption takes place under the supervision of the enforcement agent 262 and security policy broker 260, the information contained within this redistributed secure file 240 remains under the protection and control of the security policy being enforced by the enforcement agent 262 and security policy broker 260. Any conventional cryptographic techniques can be used to digitally sign and/or encrypt the contents of secure file 240, or any portion thereof. Examples of conventional encryption techniques include: public key cryptosystems; symmetric key cryptosystems, such as block ciphers and stream ciphers; cryptographic hash algorithms, such as SHA-1, MD5, and HMAC algorithms; and digital signing and verification. The cryptographic keys are stored and protected using conventional techniques. Examples of conventional cryptographic key techniques include: passwords and passphrases for the protection of cryptographic keys; and FIPS-140 type storage devices.

In various embodiments of the invention, any of the data structures used by the invention can be encrypted and/or digitally signed. For example, if security label 336 is digitally signed by the security policy server 290, the security policy broker 260 verifies the validity of this digital signature before attempting to look up the corresponding security directive record 410.

FIG. 10 illustrates a security directive 400 of the invention. The enforcement agent 262 and security policy broker 260 use security directive records 410 associated with each secure file 240 to determine how the security of each such secure file 240 is to be maintained. More specifically, security directive record 410 is associated with a specific payload 340 within a secure file 240, and different payloads 340 may be associated with different security directive records 410. The security label 336, 460 is the mechanism through which a security directive record 410 is associated with the object it protects. However, in addition to protecting secure files 240, the invention may also be used to protect different types of resources, including both hardware components within the information system (e.g., printer 150, communication interface 154) and software constructs within the information system (e.g., files 130, directories, named-pipes, communications protocols).

Target 480 identifies a component of the information system 200, and represents any hardware or software element within an information system 200 that the security policy broker 260 has been configured to protect. Each target 480 has an associated security label 460, which directs the security policy broker 260 to the security directive record 410 associated with the target. For example, the target 480 can identify: a secure file 240; a communications interface 154; a printer 150; USB reader 220; and a folder, a directory, or other file organization structure within USB reader 220.

The security label 460 is an electronically encoded representation of a humanly readable artifact (e.g., a text string, symbol, glyph, or other marking) which can be made apparent to user 101 in any number of ways. For example, the security label can be made apparent to user 101 by being: shown on the display 148; rendered on hardcopy by the printer 150; or captured as part of the name of the secure file 240 placed in USB reader 220. The security label 460 is not limited to simple text and may include any marking or indicia. This flexibility allows, for example, security labels 460 to be encoded in different languages, allowing meaningful country-specific word choices; without incurring the administrative overhead of having to maintain a large number of identical security directives.

For targets 480 that are within secure files 240, security labels 460 and security directive records 410 are used to apply non-discretionary access controls to each payload 340 contained within the payload section 320 of secure file 240. The enforcement agent 262 accessing the specific manifest record 330 associated with each payload 340 passes the security label 336 contained within manifest record 330 to a security policy broker 260. The security policy broker 260 is then able to determine the security directive record 410 associated with that security label 336 under the current security policy.

The mechanism used to associate a security directive records 410 with non-file targets varies depending upon the specific architecture of each operating system 112 (or virtual operating system/virtual machine), and the manner in which an enforcement agent 262 is configured. For example, UNIX and UNIX-type operating systems represent hardware devices and software constructs as file-like devices (e.g., /dev, /proc/), and a pseudo-device driver can be used to associate an enforcement agent 262 with these components.

The security directive 400 is formed as a data structure and the relationships between the components of the data structure are illustrated in FIG. 10. The arrowheads in FIG. 10 (and in FIG. 11) do not refer to directionality, but instead indicate the type of relationships between components. A single black arrowhead (e.g., between security directive record 410 and security classification record 470) indicates exactly one, and can be read as: "security directive record 410 has exactly one security classification 470." A double black arrowhead (e.g., between security directive record 410 and security label 460) indicates one or more (1+), and can be read as: "security directive record 410 has one or more security labels 460." A double outline arrowhead (e.g., between rule record 412 and c-list record 434) indicates zero or more (0+ or 0/1/1+), and can be read as: "rule record 412 has zero or more c-lists 434." A single outline arrowhead (e.g., between security directive record 410 and crypto-flags 462) indicates zero or exactly one (0/1), and can be read as: "security directive record 410 has zero or one crypto-flags 462".

The logical structure of security directive 400 begins with the security directive record 410. The various components of the security directive record 410 can be referred to as records, although other types of data structures and/or formats can be used to implement this logical structure. For example, the logical structure can be implemented using: arrays, linked lists, data sets, b-trees, queues, and lookup tables.

The security directive record 410 includes one or more rule-related records 416, a security classification 470, zero or more security labels 460, and zero or one crypto-flags 462. In other embodiments, instead of having both rule-related records 416 and a security classification 470, the security directive record 410 includes one or more rules-related records 416 and zero or one security classification 470, or the security directive record 410 includes zero or more rule related records 416 and a security classification 470.

The rule-related records 416 include rules that specify how specific actions and conditions are to be handled with respect to the payload 340 of a secure file 240 or other target 480. Any specified conditions must be satisfied before the application 116 is permitted to perform the specified actions. The rule-related records 416 include r-list records 414, rule records 412, a-list records 424, c-list records 434, e-list records 444, s-list records 454, action records 420, condition records 430, event records 440, and subject records 450. Each r-list record 414 includes one or more rule records 412. Each rule record 412 includes zero or more a-list records 424, zero or more c-list records 434, zero or more e-list records 444, and at least one s-list record 454. Each a-list record 424 includes at least one action record 420. Each c-list record 434 includes at least one condition record 430. Each e-list record 444 includes at least one event record 440. Each s-list record 454 includes at least one subject record 450.

The rule-related records 416 include elements referred to as lists, although other types of data structures and/or formats can be used, for example: arrays, linked lists, data sets, b-trees, queues, and lookup tables.

An action record 420 comprises any activity performed upon the target 480 of a security directive record 410. Examples of actions include: opening and closing a payload 340 of a secure file 240; making changes to a payload 340 of a secure file 240; making a copy of a payload 340 of a secure file 240; making a copy of secure file 240; deleting a secure file 240; creating a new secure file 240; printing a payload 340 of a secure file 240; printing a screen capture of display 148 while payload 340 is visible; unauthorized printing of unsecured files to secured printers; transmitting a copy of a secure file 240 to another party through email or the network 190; transmitting unsecured files through a secured communications device to a destination outside of the local area network; and placing copies of unsecured files on secured diskette drive.

A condition record 430 comprises any condition or conditional expression that can be measured or evaluated within the context of the information system 200. Examples of conditions include: restrictions on time of day a payload 340 within a secure file 240 can be accessed; the availability of a low-latency network connection to the network 190; and how the identity of a subject in the subject record 450 must be authenticated.

An event record 440 (also referred to as an auditing event record) comprises an auditing-related activity associated with a given rule and causes an audit record to be written, depending upon the specifics of the event. Examples of events include: the creation of auditable records when a given rule is evaluated by the security policy broker 260 (i.e., a rule-evaluated event); when an action associated with a given rule is permitted to take place by the security policy broker 260 (i.e., a rule-allowed event); and when a given action associated with a given action is not permitted to take place by the security policy broker 260 (i.e., a rule-denied event).

A subject record 450 comprises one or more users and/or processes against which the rule record 412 applies. Examples of a subject record include: Joe B. Smith; and all employees. Different types of action records 420, condition records 430, and event records 440 can be applicable to different types of secure files 240, depending on, for example, the nature of the secure file 240, the format of the secure file 240, the application being used to manipulate the secure file 240, or how the secure file 240 is used. For example, a secure file 240 having auditory information can have an associated action record 420 of "play-through-speaker," while this same action has no meaningful semantic equivalent for a secure file 240 having JPEG information. Conversely, a secure file 240 having JPEG information can have an associated condition record 430 of "black-and-white image," while this same condition has no meaningful semantic equivalent for a secure file 240 having auditory information.

The security classification record 470 advantageously allows security classification of large numbers of targets 480 into compartments or categories in a manner that simplifies the management of the protections afforded by the invention. The security classification record 470 is a category or compartment to which confidential information is assigned to denote the degree of damage that unauthorized disclosure might cause. Depending upon the specific security policy, any number of such categories can be defined. The security classification record 470 includes a security level 474 and zero or more security compartments 472. The security level 474 comprises a hierarchical representation of the relative confidentiality associated with the security directive 400, as exemplified by the policy table of FIG. 6. One or more security levels can be determined for the security policy. For example, a company or government agency may desire that information be hierarchically organized according three security levels of classified, secret, and top-secret. In some embodiments, security level 474 can be represented as a numerical value, where lower-valued security levels represent less confidential information, and higher-valued security levels represent more confidential information.

Each security compartment 472 is a non-hierarchical attribute of the security directive 400. The security compartments 472 permit further compartmentalization (which may also be referred to as compartmentization) for a security level 474. Compartmentalization provides a technique to add additional security-related categories that allow information to be managed and shared between users only to the extent required for the performance of their individually assigned duties. In other words, compartmentalization may be conceptually thought of as a mechanism of dividing information into categories so that some users may be granted permission to access information in one category, and not another. The use of compartmentalization techniques provides a mechanism for implementing the "need to know" principle common to many secure environments.

The crypto-flags 462 specify what cryptographic techniques, if any, are associated with the security directive record 410. If no cryptographic techniques are to be used, the crypto-flags may indicate this condition, or the crypto-flags may be omitted. The crypto-flags 462 dictate the type of cryptography, if any, that the security policy requires for target 480. Examples of crypto-flags 462 include: specific algorithms that can or must be used; allowed cryptographic key lengths; specific requirements for crypto-key storage (e.g., only use FIP-140 type device); and other crypto-related requirements or specifications. The crypto-flags 462 do not necessarily include a specific cryptographic state, such as an actual cryptographic cipher key but specify the mandated cryptographic techniques.

The data structure of the security directive 400 can be stored in a variety of locations, including, for example: the policy server 280; the directory service 270; the policy broker cache 264; and a secure file 240. In most cases, however, the canonical copy of any given security directive record 410 associated with security directive 400 is maintained by the security policy server 290 with copies of the these records temporarily stored in other locations for the convenience of processing without always requiring a networked connection to the policy server 290.

For example, a copy of the rule-related records 416 associated with the security directive record 410 can be part of the directive payload 322 of the secure file 240. The rule-related records 416 can then be loaded and temporarily maintained within the policy broker cache 264. In another embodiment, the rule-related records 416 can be retrieved as needed from the policy server 290. In another embodiment, a portion of the rule-related records 416 can be stored as part of the directive payload 322 of the secure file 240, and another portion of the rule-related records 416 can be retrieved as needed from the policy server 290. By requiring retrieval from the policy server 290, the security policy can be updated for secure files 240 that have previously been distributed to information systems.

In other circumstances, for example for non-file targets 480, the security directive record 410 associated with a target 480 may be implicitly specified as part of the initialization of the security policy broker 260 for the information system 200. The security directive 400 can be dynamic. Any of the components of the security directive 400 can be modified in any way, at any time, by an authorized party or process, and the resulting changes are honored by all subsequent enforcement decisions rendered by the security policy broker 260. For example, if the rules-related records 416 are modified, upon retrieving the updated security directive record 410, security policy broker 260 determines policy for targets 480 associated with security label 460 according to the modification. If a large number of secure files 240 have the same security label 460, all of the secure files 240 are protected and controlled according to the modified rules of the security directive 400.

Figure 11:
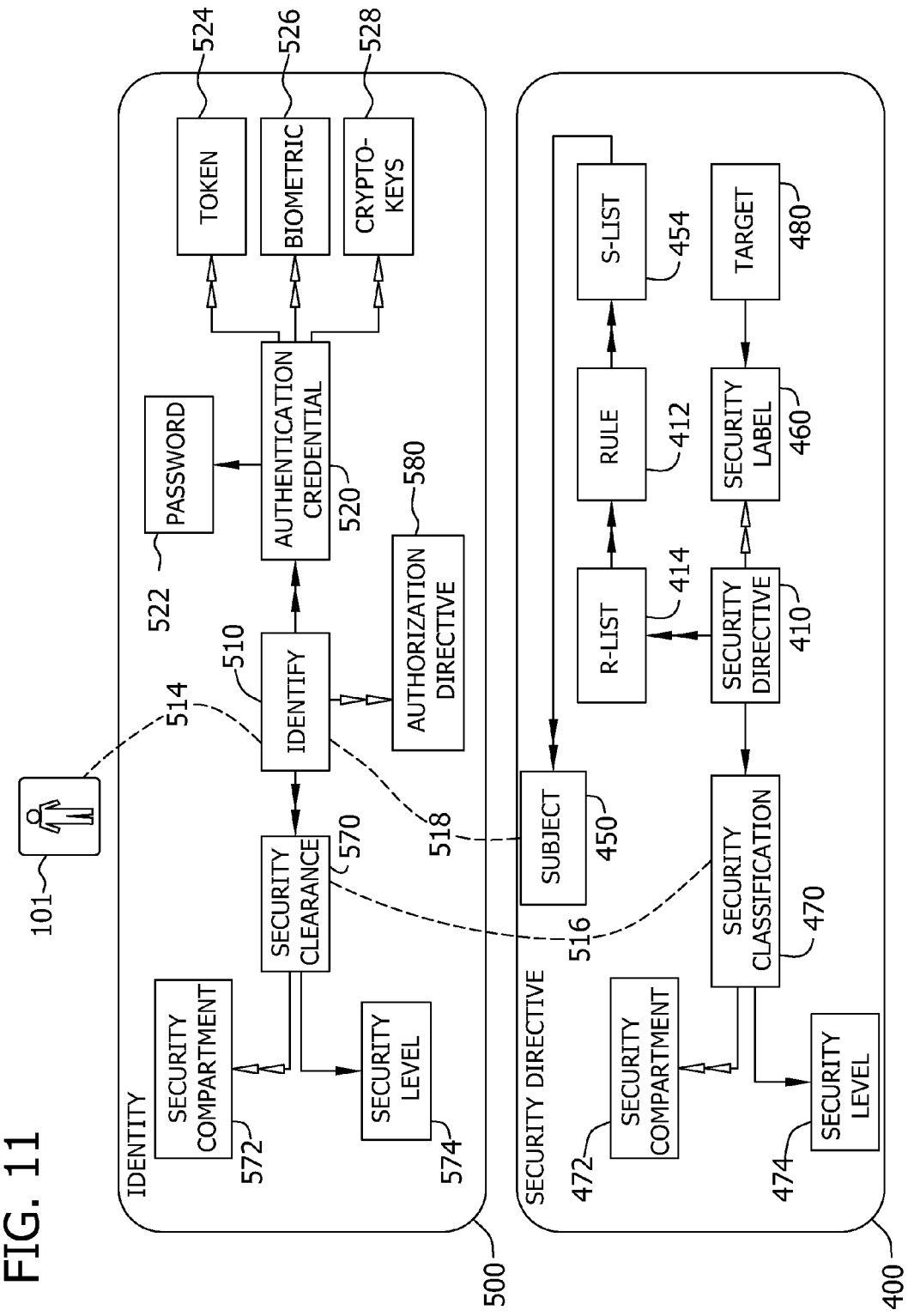
FIG. 11 illustrates an identity of the invention and its relationship to a user and a security directive.

FIG. 11 illustrates an identity 500 of the invention and its relationship to a user 101 and a security directive 400. The security directive 400 of FIG. 11 is the same as the security directive 400 of FIG. 10 but is not depicted with all components for the sake of clarity. The identity 500 can be associated with a user 101. Examples of a user include: a person or persons; a role or position; an automated process (e.g., a software daemon, agent, or process); a physical automated agent (e.g., as a robot or an unmanned aerial vehicle); "batch-type" programs that run with other periodic interaction with real persons; various system services which run in process context specific (e.g., "mail daemon" running under the pseudo-identity of "mail"); and programs the run on behalf of the system itself (e.g., "telnet" or "sshd").

The identities 500 are stored within the security policy server 290 and/or the directory service 280. The identity 500 specifies the manner by which the security policy broker can authenticate user 101 and the security clearance that user 101 is authorized to bold. An identity 500 is created for user 101 by a competent authority. The relationship between the user 101 and the identity 500 is illustrated with a user-identity relationship 514. The user-identity relationship 514 is verified via the authentication credentials 520. The invention can utilize any number of prior art authentication methods and protocols to validate and verify the identity 500 of user 101, and thus validate the user-identity relationship 514.

The logical structure of identity 500 begins with the identity record 510, and the relationships between the components of the data structure are illustrated using the same relationship notations used in FIG. 4. The various components of the identity record 510 can be referred to as records, although other types of data structures and/or formats can be used to implement this logical structure within the invention. For example, the logical structure can be implemented with: arrays, linked lists, data sets, b-trees, queues, and lookup tables.

The identity 510 includes one or more authentication credentials 520, one or more security clearances 570, and zero or more authorization directives 580. Each authentication credential 520 includes a password 522, zero or more token 524, zero or more biometric 526, and zero or more crypto-keys 528. In other embodiments, the authentication credential 520 can includes at least one of a password 522, a token 524, a biometric 526, and crypto-keys 528, or any combination of them. Other prior art identity verification techniques can also be employed.

The password 522 is a shared secret, known to both the authentication identification system 166 and the user 101. The password 522 can be a conventional text string (e.g., alphanumeric) or can be any information type determined by the user 101 as secret information to obtain access to the information system 200. Other embodiments may utilize any type of secret information that can be shared between user 101 and the security policy server 290 and readily provided by user 101 when requested.

The token 524 contains information specific to the hardware authentication token permitted to be used to authenticate the identity of user 101. Examples of the token 524 include: the type of hardware authentication protocol being used; the location of the authentication identification system 166 to be used; and other types of hardware-specific authentication information that may necessary.

The biometric 526 contains information specific to the biometric authentication device permitted to be used to authenticate the identity of user 101. Examples of the biometric 526 include: the type of hardware authentication protocol being used; the location of the authentication identification system 166 to be used; and other types of biometric hardware-specific authentication information that may necessary.

The crypto-keys 528 contain cryptologic information necessary to authenticate the identity of user 101 based on one or more cryptographic keys. For example, if PKI-based authentication is being used, crypto-keys may contain the public key of user 101 signed by a recognized certificate authority. All of the authentication credentials 520, including password 522, token 524, biometric 526, and crypto-keys 528 are based on well known and well established prior art authentication techniques and protocols. Different embodiments may implement these various authentication credential records 520 in different ways. In some embodiments, the security policy broker 260 may also rely upon any authentication mechanisms provided as part of the operating system 112 in information system 200.

Each clearance record 570 provides the security clearance authority given to the user 101. Each classification record 570 includes a security level 574 and zero or more security compartments 572. The security clearance is a property associated with users, and the security classification is a property associated with targets. Thus, the security compartments 572 and the security level 574 of the identity record 510 mirror the security compartments 472 and the security level 474, respectively, in the security directive record 410.

The authorization directive 580 constrains what protections and controls user 101 may apply to information. The authorization directive 580 is used to apply non-discretionary controls that user 101 may be mandated to apply with regards to targets 480 of security directives 400. The authorization directive 580 specifies what elements of the security policy (e.g., security labels 460 and security directives records 410) must and/or may be applied by user 101. Each authorization directive 580 has the same form as a security directive record 410, can contain all of the information contained in a security directive record 410, and further specifies the circumstances and conditions under which the included security directive record 410 applies.

To determine if the user 101 can perform the requested action to a secure file 240 (or other target 480), the security policy broker 260 performs a clearance-classification check 516 and an identity-subject check 518. To perform the clearance-classification check 516, the security clearances 570 of the identity record 510 and the security classification 470 of the security directive record 410 are compared. More specifically, the security compartments 572 and the security compartments 472 are compared, and the security level 574 and the security level 474 are compared. To pass the clearance-classification check 516, the security clearances 570 of the identity record 510 must dominate (e.g., via the Bell-LaPadula domination rule) the security classification 470 of the security directive record 410. For this embodiment, to pass the clearance-classification check 516, the security compartments 572 must include (or be as large as) the security compartments 472, and the security level 574 must be at least as great as the security level 574.

To perform the identity-subject check 518, the subject 450 associated with the security directive record 410 is used. The security policy broker 260 authenticates the identity 500 of user 101 using one or more of the authentication credentials 520 associated with the identity record 510. Based on the strength of the results from the identity-subject check 514, the security policy broker 260 ascertains if user 101 satisfies the rule 412. The identity-subject check 518 is performed when a subject record 450 is present in the security directive record 410.

Figure 12:
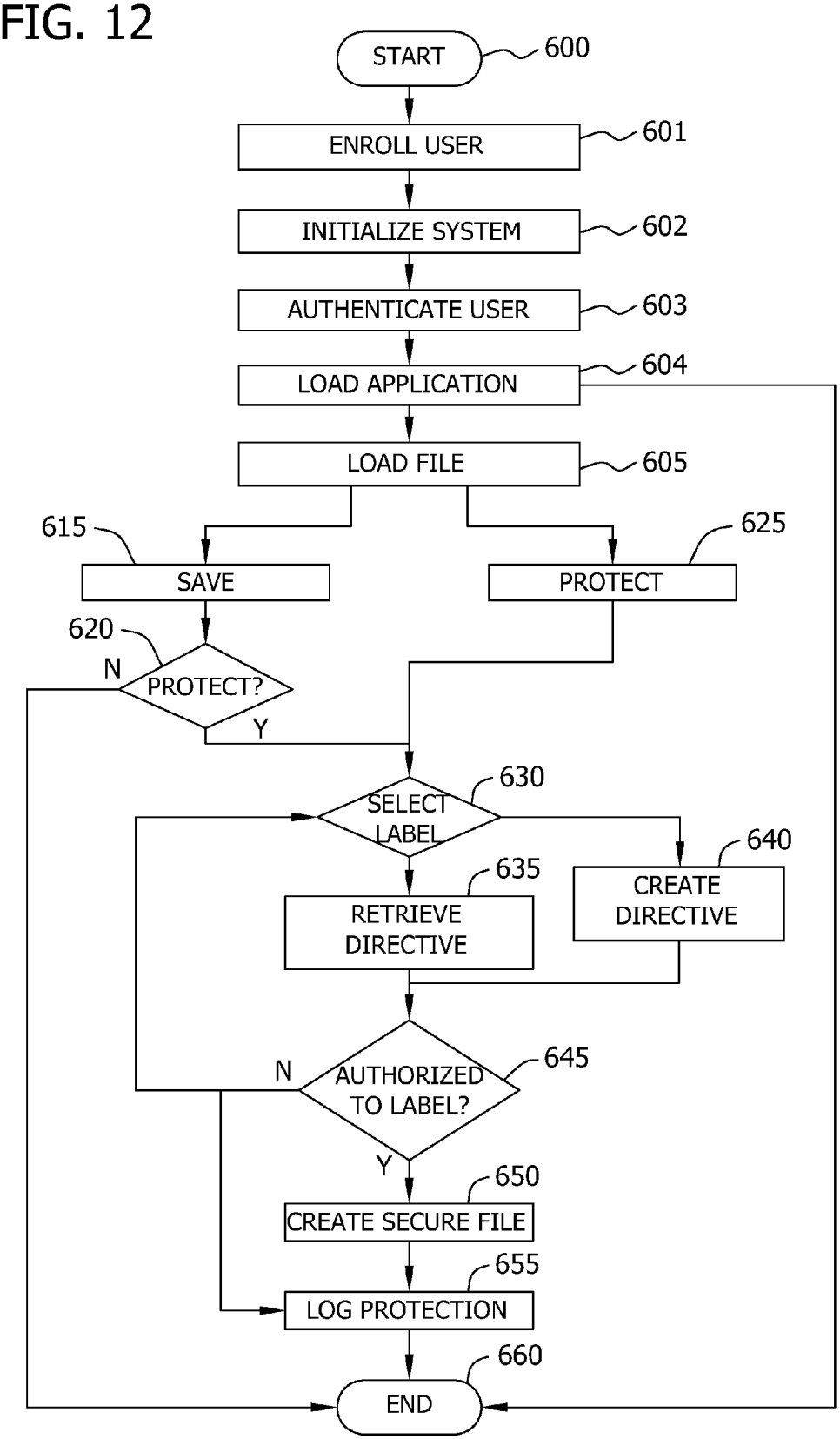
FIG. 12 illustrates a flowchart for creating a secure file in relation to FIGS. 5-11.

FIG. 12 illustrates a flowchart for creating a secure file 240 in relation to FIGS. 5-11. In block 601, the user 101 is enrolled in the distributed information protection and control system. An identity record 510 is created by/for the user 101 and stored in directory service 280.

The creation of the identity record 510 may require additional identity records 510, a subset of such records, and/or appending additional data to existing records in the directory service 280. In block 602, the user 101 initializes the information system 200. As part of the information system 200 initialization, the enforcement agent 262B can be associated with operating system shell 115 in application process 214B. Additionally, the security policy broker 260 can be initiated to work with enforcement agent 262B.

In block 603, the user 101 is authenticated. The information system 200 matches the user 101 with the identity 500 and associated identity records 510. The matching is accomplished with the authentication credentials 520. The user 101 may be required to reply correctly to authentication challenges by the information system 200. If the user 101 provides the appropriate response(s) based on the authentication credentials 520, the user 101 is matched with the identity 500 and associated identity records 510. In other embodiments, the matching can occur using any conventional techniques. For example, the information system can match the user 101 based on authentication techniques implemented by the operating system 112. Once authenticated, the information system 200 matches the user 101 with identity 500, and this user-identity relationship is illustrated in FIG. 5 with the dotted line 514.

In block 604, an application is loaded. The user 101 starts up the application 116 within the application process 214C. In some embodiments, the invention is in either an active state or an inactive state. For the active state, when the operating system 112 loads application program 116 into non-persistent storage 210, enforcement agent 262C is associated with the application process 214C. The enforcement agent 262B associated with the operating system shell 115 monitors the application processes that the operating system shell 115 loads into the non-persistent storage 210. When the operating system shell 115 loads the application process 114C into the non-persistent storage 210, the enforcement agent 262B assigns the enforcement agent 262C to the application process 114C (transforming it to application process 214C). For the inactive state, enforcement agent 262B does not assign enforcement agent 262B to application process 114C, in which case secure files 240 can neither be created nor accessed by application 116 in application process 114C. In other embodiments, various actions within this flow could cause enforcement agent 262C to be assigned to application process 114C.

In block 605, user 101 loads a file 130 using the application 116. Loading a file 130 can include, for example: creating content; opening an existing file, 130; and manipulating the application 116 (e.g., a file manager), which does not open and load a file 130 in the same manner as an application normally used to create and manipulate that type of file 130, but which may take certain actions on the file 130.

In block 615, the user 101 requests to save the file. Enforcement agent 262C intercepts the resulting data-saving request made by the application process 114C to the operating system 112.

In block 620, the security policy broker 260 determines, based upon the authorization directive 580, that the user 101 must protect the file 130 and proceed on to block 630. If authorization directive 580 does not require that user 101 protect file 130 or if an authorization directive 580 does not exist, the user 101 has an option to choose whether to protect the file 130. If the user 101 chooses not to protect the file 130, the flow ends at block 660, and the application 116 conventionally saves the file 130.

Figure 14:
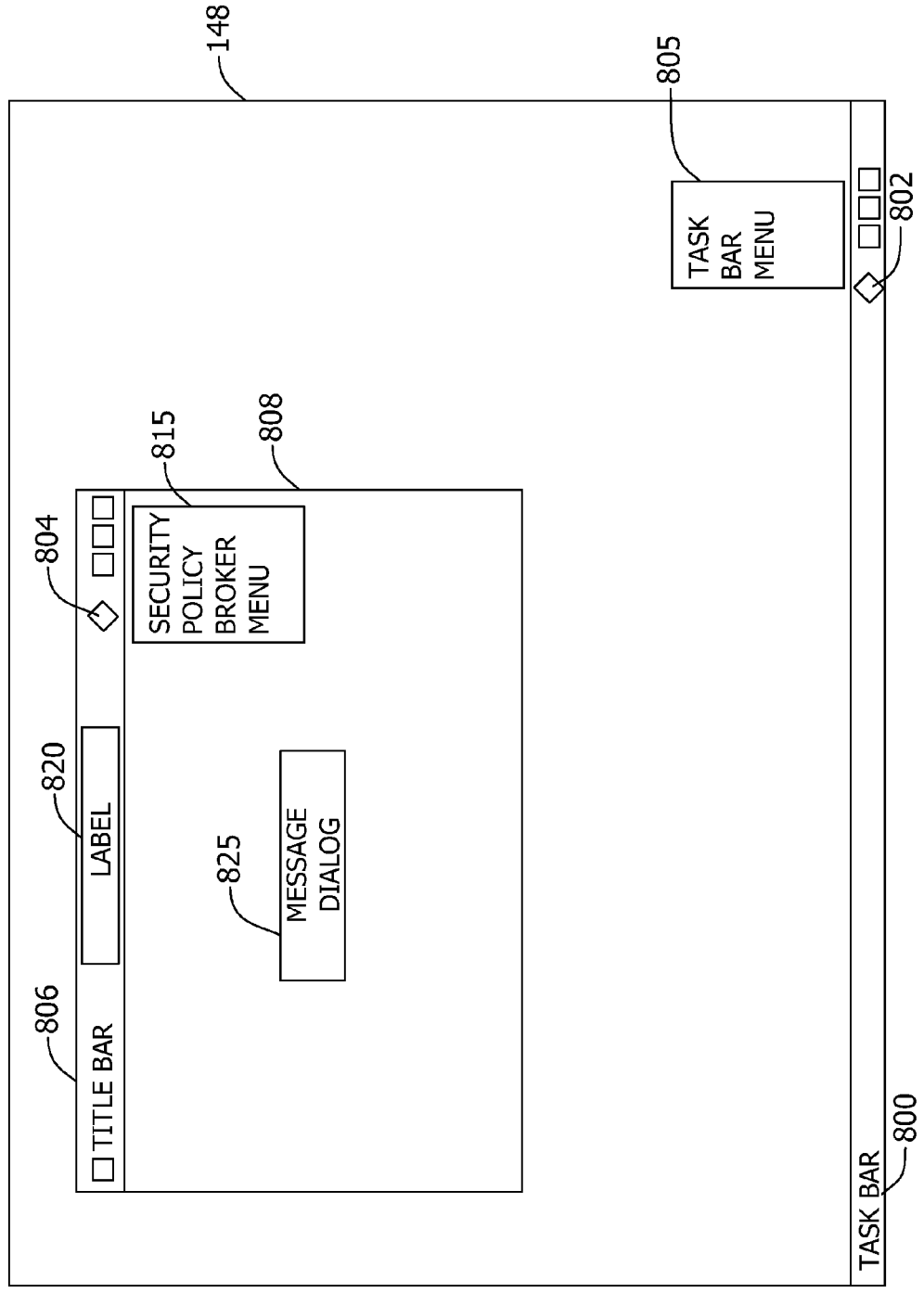
FIG. 14 illustrates an exemplary user interface for the display of the information system.

In block 625, the user 101 requests to protect the file. In some embodiments, this request can originate from the user 101 selecting this action via the title bar icon 804 (FIG. 14). In other embodiments, this request can be initiated through a separate application program or utility.

In block 630, user 101 selects a security label 460 to be associated with the secure file. The security label 460 is assigned as security label 336 with the manifest record(s) 330 of the payload(s) 340 within which the information contained in file 130 is to be stored. If the user 101 selects to assign a previously defined security label 460, flow proceeds to block 635. If the user 101 selects to create a new security directive 400, flow proceeds to block 640. Only the security labels 460 that the user 101 is authorized to assign (including the option to create a new security label 460), as specified in authorization directive 580, are offered to the user 101 for selection in block 630.

In block 635, the security policy broker 260 retrieves the security directive record 410 corresponding to the selected security label 460. The security policy broker 260 can retrieve security directive records 410 from, for example: the policy broker cache 264 and/or the security policy server 290.

In block 640, user 101 creates a new security directive 400. Creating a new security directive 400 entails creating a security directive record 410.

In block 645, the security policy broker 260 validates that the user 101 is authorized to apply the selected security label 460 as the security label 336 of the manifest record 330 for the secure file 240. If user 101 created a new security directive in block 640, the new security directive is validated. The validation can include verification of the authentication credentials 520, if required by security directive record 410. If user 101 is authorized to apply security label 460, flow proceeds to block 650. If the user 101 is not authorized to apply the selected security label, flow returns back to block 630 or continues to block 655. If, at block 620, the user 101 was required to protect the file, but user 101 does not select an authorized security label 460, user 101 is unable to save the file 130 as secure file 240. In some embodiments, if in active state, user 101 is prohibited from saving file 130.

In block 650, the enforcement agent 262C generates the secure file 240, with file 130 becoming the primary payload 324, and applies the cryptographic techniques as required by the crypto-flags 462 of the security directive record 410. The manifest record 330 of primary payload 322 contains security label 336, as selected via blocks 630, 635, 640, and 645. The security policy broker 260 can require the user 101 to present authentication credentials 520 to perform acts of cryptographically signing one or more parts of the secure file 240. The enforcement agent 262C and the security policy broker 260 can communicate with the directory service 280 to determine various identity information on potential recipients of the file 130, such as identity group resolution, contact details, and crypto-keys. If desired, enforcement agent 262C can securely delete file 130 at step 650.

In block 655, if required, the security policy broker 260 logs the creation of the new secure file 240 to the audit server 270. If, at block 645, user 101 was denied authorization to apply desired security label 260, security policy broker 260 may log the attempted security label 260 to audit server 270. Logging may be required by the security directive record 410 associated with the selected security label 336, as specified within the e-list 444.

In block 660 the flow ends, when the user 101 closes the file 130, or when the user 101 closes the file 130 without saving or protecting the file 130. In another embodiment, secure file 240 may not be physically created in USB reader 220 until user 101 chooses to save file 130.

Figure 13:
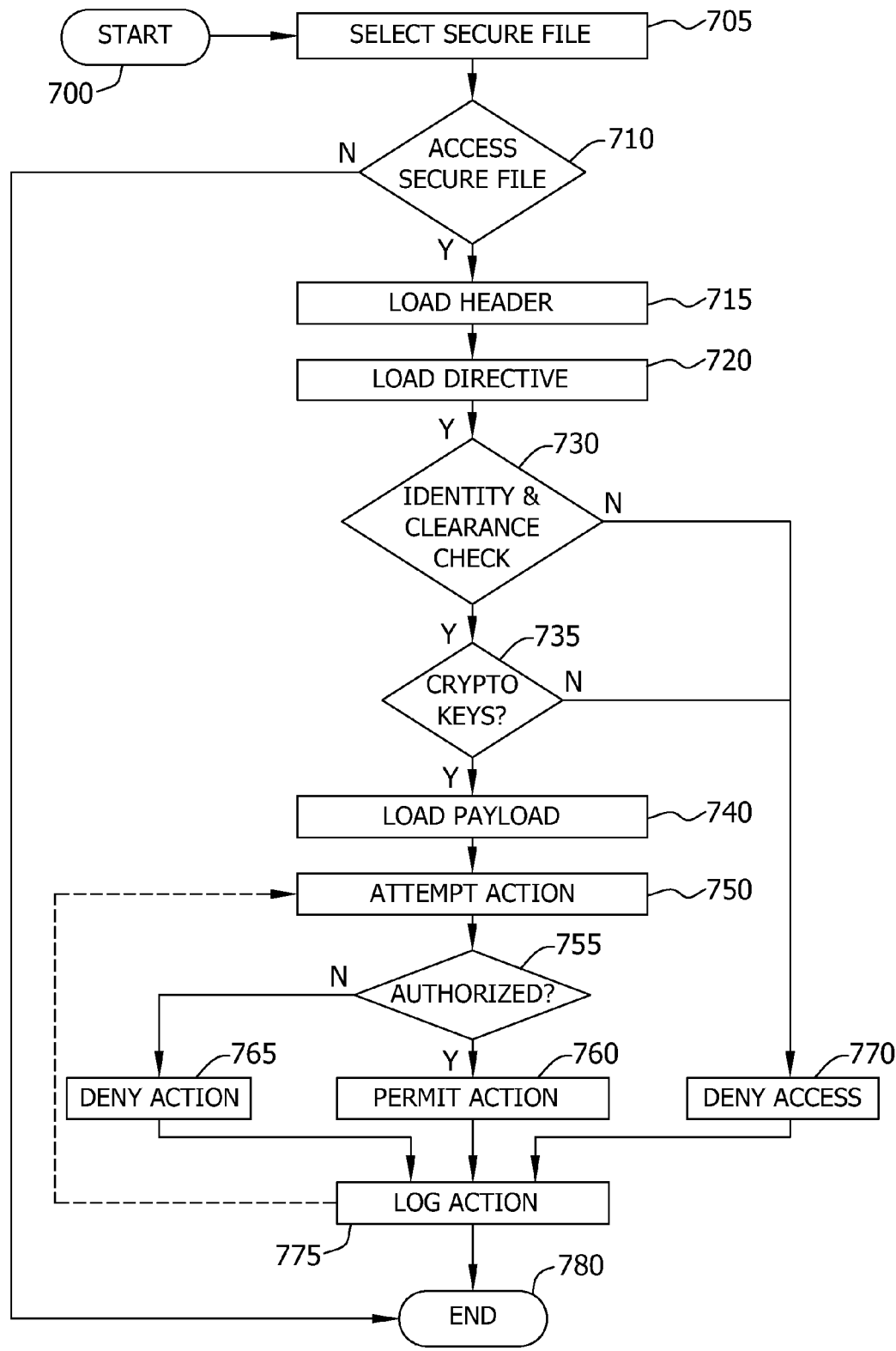
FIG. 13 illustrates a flow chart for accessing a secure file in relation to FIGS. 5-11.

FIG. 13 illustrates a flow chart for accessing a secure file 240 in relation to FIGS. 5-11. In block 700, the information system 240 is running properly, and blocks 601-604 have been performed.

In block 705, the user 101 requests to access a secure file 240 via application 116C in application process 214C. Enforcement agent 262C intercepts the request made to the operating system 112 by the application process 214C accessing the secure file 240.

In block 710, the enforcement agent 262C determines if the selected secure file 240 can be accessed. The enforcement agent 262C checks the user-identity relationship 514 using the authentication credentials 520. If the user 101 passes the check, the secure file 240 is accessed, and flow proceeds to block 715. If the enforcement agent 262C and security policy broker 260 are not available, the operating system 112 can start the enforcement agent 262C and the security policy broker 260. If the enforcement agent 262C or the security policy broker 260 cannot be found or started, or if user 101 fails the check (i.e., cannot provide the required authentication credentials 520 to validate the user-identity relationship 514), flow proceeds to and ends at block 780, and the user 101 cannot access the secure file 240.

In block 715, the enforcement agent 262C provides the security policy broker 260 with header section 310 of the secure file 240. In block 720, the security policy broker 260 obtains the security directive record 410 associated with the security label 336 for the primary payload 324. The security directive record 410 can be contained, for example, within the directive payload 322 of the secure file 240, within the policy broker cache 264, and/or retrieved from the security policy server 290. If the security directive record 410 is located within the directive payload 322, the enforcement agent 262C forwards the security directive record 410 to the security policy broker 260. In other embodiments, the enforcement agent 262C can provide callback functions to the security policy broker 260 to retrieve the directive payload 322.

In block 730, the security policy broker 260 performs a clearance-classification check 516 and an identity-subject check 518. To perform the checks, the security policy broker 260 accesses the security classification record 470 and the subject records 450 for the security directive record 410. As discussed above, the clearance-classification check 516 is performed using the security clearance records 570 of the identity record 510 associated the user 101 and the security classification records 470 of the security directive record 410 associated with the security label 336. As discussed above, the identity-subject check 518 is performed using the identity record 510 and the subject record 450. If user 101 passes, flow passes to block 735. If user 101 fails either the clearance-classification check 516 or the identity-subject cheek 518, user 101 is denied access to the payload 340 of secure file 240, and flow proceeds to block 770.

In block 735, the enforcement agent 262C determines whether the crypto-keys 338 from the manifest record 330 corresponding to the payload(s) 340 being accessed within the secure file 240 can be accessed. The crypto-keys 338 of the secure file are accessed via the crypto-keys 528 for the identity record 510. Crypto-keys 338 may be required in order to decrypt a payload 340, but crypto-keys 338 may also be encrypted. In various embodiments, various mechanisms may be employed to provide enforcement agent 262C with access to crypto-keys 338 to decrypt payload 340 of secure file 240. For example, enforcement agent 262C may communicate with policy server 290 to have crypto-keys 338 decrypted and re-encrypted in such a manner that crypto-keys 528 are able to access crypto-keys 338. As another example, enforcement agent 262C may retrieve crypto-keys 338, which are stored on security policy server 290 rather than within manifest record 333. As a further example, payload 340 may not be encrypted. If the crypto-keys 528 for the identity record 510 decrypt crypto-keys 338, flow proceeds to block 740. If the crypto-keys 528 cannot decrypt crypto-keys 338, user 101 is not permitted access to payload 340, and the flow proceeds to block 770.

In block 740, the enforcement agent 262C loads one or more payloads 340 from the payload section 320 of the secure file 240 into non-persistent storage associated with application process 214C, provided that user 101 has the required authorization to access the desired payload blocks 341, 342, 343, etc. It is possible that different payloads 340 (e.g., primary payload 324 and each ancillary payload 326) have different security labels 336 and, hence, different associated security directive records 410, such that user 101 may be authorized to access one payload 340 but not another. Any encrypted blocks can be decrypted by the enforcement agent 262C using the accessed crypto-keys 338. Thus, application 116 within application process 214C is able to reference primary payload 324, just as if it were the original file 130.

In block 750, the user 101 requests an action on the information in a payload 340 of the secure file 240. The enforcement agent 262C intercepts the request from the application 116 in application process 214C to the operating system 112.

In block 755, the security policy broker 260 evaluates the requested action by checking rule-related records 416 of the security directive records 410 to determine if the user 101 is permitted to perform the requested action. Additionally, as an option, the security policy broker 260 can again verify the user-identity relationship 514. For example, the user 101 can be required to provide and/or revalidate authentication credentials 520 prior to being authorized for the action.

If the rule-related records 416 of the security directive records 410 has action records 420, the security policy broker 260 notifies the enforcement agent 262C that the user 101 is authorized for and/or prohibited from the actions of the action records 420. If rule-related records 416 has condition records 430, the security policy broker 260 determines if the condition records 430 are satisfied, and notifies the enforcement agent 262C whether or not the association action should be permitted. If the action is permitted, flow proceeds to block 760; otherwise if the action is not permitted, flow proceeds to block 765.

In block 760, user 101 is authorized, and the security policy broker 260 notifies the enforcement agent 262C that the user 101 can continue with the request. Enforcement agent 262C passes the request made by application 116C to the operating system 112.

In block 765, user 101 is not authorized, and the security policy broker 260 notifies the enforcement agent 262C that the user 101 cannot continue with the request. The enforcement agent 262C prevents the action from occurring by not permitting the intercepted request made by the application process 214C to proceed to the operating system 112, and providing an appropriate response to the application 116 within application process 214C. In other embodiments, this response may emulate operating system request-return values. In other embodiments, this response may include request-return values specific to the invention. The enforcement agent 262C can also present an error message 825 (see FIG. 14) to the user 101 via the display 148.

In block 770, the user 101 is denied access to the contents of secure file 240, as a result of decisions made in blocks 730 or 735.

In block 775, the result of previous block steps 760, 765, and 770 are audited, if required by security directive records 410. If the security directive record 410 has event records 440, the security policy broker 260 and/or the enforcement agent 262C supplies a record audit of the events to the audit server 270. Such audit logs may, for example, contain information such as: the secure file identifier 312 of the secure file 240; the identity record 510 of the user 101; identification of the information system 200; the security label 460; the application 116; the action attempted; the conditions, relating to condition records 430; and the success or failure of the requested action. In other embodiments, the enforcement agent 262C can access the audit server 270 periodically, non-periodically and/or "on demand" when an event occurs. In some embodiments, auditable events may be temporarily stored in the enforcement agent cache 268 by enforcement agent 262C, and in the policy broker cache 264 by the security policy broker 260, prior to their being transmitted to audit server 270.

As long as the user 101 continues to access secure file 240, flow proceeds from block 775 to block 750. The enforcement agent 262 continues to intercept requested actions, and the security policy broker 260 continues to intercept these actions in the manner so described (blocks 750-775). Any additional files created in persistent storage by application 116 that are associated with the contents of secure file 240 (e.g., temporary files, earlier revisions of the file, and backups of the file) are stored either within enforcement agent cache 268 or as other secure files. If the crypto-flags record 462 of security directive record 410 specifies that such information is to be encrypted, all such additional and/or temporary files are encrypted appropriately.

The presence of the invention in the information system 200 can be indicated to the user 101 in a variety of ways (e.g., visual and/or audio). For example, for operating systems 112 with a graphical user interface ("GUI"), such as Microsoft Windows or X-Windows, the presence of the invention can be shown visually, and user 101 can be provided with various GUI elements for interacting with the invention. Sound, and other acoustic indications, can also be used to facilitate user interaction in a manner appropriate to the operating system and user-interface.

FIG. 14 illustrates an exemplary user interface for the display 148 of the information system 200. As an example, if the operating system 112 is Microsoft Windows, a task bar icon 802 can be displayed within the task bar 800 as a visual GUI-based indication of the presence of the invention. This task bar icon 802 can also provide pictorial representations of the state of the enforcement agents 262B, 262C running within the application process 214B, 214C. The user may "click on" or otherwise select this task bar icon 802 to further reveal a task bar menu 805 with additional choices. With the menu, the user 101 can, for example: change the state of existing enforcement agents 262; change the state of all enforcement agents 262; and access other command and control functions provided by the invention. The task bar icon 802 and task bar menu 805 may be managed by the security policy broker 260 or by an independent software process created solely to provide these user-interface constructs.

Continuing with this example, if an enforcement agent 262 is assigned to an application process 214 having GUI elements, a title bar icon 804 in the title bar 806 in the window 808 for the application process 214 can be provided. The title bar icon 804 indicates whether the information displayed in window 808 is contained in a secure file 240, and displays the associated security label 460 (i.e., determined by the security label 336 associated with the manifest record 330 of the payload 340 containing the displayed information) as application window label 820. If information is being displayed from multiple payloads (e.g., both primary and ancillary payloads), the label 820 of title bar 806 of the application window 808 is updated appropriately. If application process 214 has multiple application windows 808, each title bar icon 804 and application window label 820 will reflect the security label associated with the information specific to that window.

The title bar icon 804 of window 808 can further be selected to reveal a security policy broker menu 815. For example, the user 101 can, if authorized: convert a file 130 to a secure file 240; view currently authorized actions on the payload 320 of secure file 240; and modify security directive records 410. Selecting one or more of these options may cause the security policy broker 260 to launch additional dialogs for user input and/or output, as required by the information being manipulated. Within some application processes 214, such as a file manager, menu 815 may be appended to a context menu, often associated with a secondary mouse button click, such that user 101 may select a file 130 and display security policy broker menu 815.

Other informational messages 825 may be displayed as needed, in a fashion common to GUI display, by the enforcement agent 262 or security policy broker 260. In some embodiments, the graphical elements of the invention (e.g., title bar icon 804, application window label 820, menu 815, and message 825) are implemented using conventional GUI constructs provided by the operating system 112 that are outside of the direct control of application 116 displaying information within window 808 (e.g., within the window manager itself, and not the application). Thus, the graphical elements associated with the invention are unapparent to and exist outside the knowledge and control of application 116.

In general, an operating system graphical user interface (e.g., the desktop in Microsoft Windows) is used for the operating system 112, and an application graphical user interface (e.g., a window in Microsoft Windows) is used for an application 116. The operating system graphical user interface and/or the application graphical user interface can be adorned with additional elements to identify the enforcement agent 262 and/or the security policy broker 260. Further, a task bar icon 802 or equivalent of the operating system graphical user interface and/or a title bar icon 804 or equivalent of the application graphical user interface can be used to identify the enforcement agent 262 and/or the security policy broker 260.

Other embodiments for operating systems 112 utilizing a GUI may use similar techniques to allow the user to control and interact with the invention. In other embodiments without a conventional GUI, other exemplary forms of interacting with the user may be used, depending upon the capabilities provided in the operating system. To illustrate the operation of the invention outside the medical records context, another example is provided. Consider a company that establishes an information classification scheme with five security levels (with values 0 to 4) and four security compartments (called HR, FA, SM, and SM). The five levels, in ascending order of confidentiality, along with their corresponding semantics are: public (level 0), official-use only (level 1), internal-use only (level 2), company confidential (level 3), and restricted (level 4). The four compartments are associate with various aspects of the company's business units: human resources (FIR), finance and accounting (FA), sales and marketing (SM), and product development (PD). The company's security directives 400 stipulate that in the absence of file-specific rules, a user may have read-only access to the payload 320 of a secure file 240 only if their individual security clearance level (i.e., security level 574) is greater than or equal to the classification level (i.e., security level 474) associated with the information contained in a secure file 240.

Example users in the company include: Bob, the Vice-President of Sales and Marketing, with a non-compartmentalized security clearance 570 of "restricted" (level 4), as well as security clearances 570 of SM-4 and FA-3; Marie, Bob's assistant, with a non-compartmentalized security clearance 570 of level 2; and Alice, a human resources manager with a non-compartmentalized security clearance 570 level 3, as well as security clearances 570 of HR-3 and FA-2.

A security directive 400 of the company requires that only senior human resources personnel may create and share information related to employee salaries. An increasing number of regulations also require that the company protect personal and private data. The invention implements this security policy to ensure that an employee's salary, which is deemed private, is not released to unauthorized individuals.

To meet this security directive 400, the company defines security directive record 410 with a security label 460, SALARY, which has a security classification record 470 of HR-3 (i.e., a security level 474 of 3 and a security compartment 472 of HR). Additionally, the security directive record 410 has a security classification record 470 of HR-3 for actions other than read via an action record 420. In other words, users with a general clearance record 570 having a security level 574 of 3 or higher can only read SALARY labeled secure files, unless the user also has a clearance record 570 having a security compartment 572 of FIR at a security level 574 of 3 or higher. Further, the rules 416 in the security directive record 410 for SALARY also permit only users who are members of the human resources department identified via a subject record 450 to label files as SALARY via an action record 420 and that any denied actions be audited via an event record 430.

Alice creates a salary report for the company as a secure file 240 using, for example, Microsoft Excel and selects the security label 460 for the secure file 240, which is incorporated as the security label 336 in the secure file 240. Alice sends the secure file 240 with the salary report as an email attachment to a distribution list via, for example, Microsoft Outlook. Bob receives the secure file 240 and is permitted to open it, since he has a security level 574 of 4. However, when Bob attempts to print the report or to copy its content to another document, the enforcement agent 262 prevents him from doing so, as he does not have a clearance record of IIR-3. Due to the enforcement agent 262 of Marie's information system 200, Marie, who has access to Bob's e-mail, is unable to open the secure file 240 because she has only a security level of 2. Bob's denied attempt to print the secure file and Marie's denied attempt to read the secure file are captured in the audit logs of the audit server 270 for the company. On the other hand, Tom, another human resources manager with a security clearance record with HR-3 has full control over the salary report in the secure file and may copy, modify, or redistribute the secure tile according to the rules in the security directive record 410 for SALARY.

If an authorized individual determines that Bob should access to the salary report, a variety of techniques can provide Bob with this ability. One option is to give the identity record 510 of Bob a clearance record 570 with I-IR-3, which would allow him full control of the salary report in the secure file 240 as welt additional authorization on other secure files 240 which include a payload 320 with a security label 336 of HR-3. Another option is to add a rule in the security directive record 410 for SALARY that permits printing by all individuals with a general clearance record 570 of level 4. Yet another option is to add a rule in the security directive record 410 for SALARY that allows anyone in the company with the title of Vice-President or above to print secure files having a security label 336 of SALARY.

If Bob intentionally or unintentionally attempts to forward the secure file 240 with the salary report to a colleague, Joe, at another company, Joe may not receive the secure file 240. For example, the rules 416 of the security directive record 410 for SALARY would likely not allow sharing such information with external entities. If Joe did receive the secure file 240, Joe is unable to access the salary report. If Joe does not have the invention (i.e., enforcement agent 262 and security policy broker 260) running on his information system, the received secure file 240 would be unintelligible to his information system 200. If Joe does have the invention running on his information system 200, it is unlikely that he would have a security level 574 of 4 for a security clearance record 570 from Bob's company. Additionally, a hacker who managed to pilfer the secure file 240 from Alice, Bob, Marie, or Joe would be unable to access the salary report of the secure file without being able to break the encryption and structure of the secure file 240.

In this example, all users are interacting only with their applications 116, such as Microsoft Excel for manipulating spreadsheets and Microsoft Outlook e-mail client. The users do not need to leave their familiar environments. In Alice's case, an additional step is required to assign the security label 460 of SALARY to the salary report. She does not need to understand the complexities of the data classification scheme in the company and only needs to know that she must label secure files 240 containing salary data as SALARY. The recipients, such as Bob and Marie, of the email with attached secure file of the salary report open the attachment in the same manner as all other attachments are opened. If Bob uses a different spreadsheet program than Alice, for example OpenOffice or Microsoft Works, the invention behaves in an identical manner and enforces the security directive 400 of SALARY.

The above-described secure USB business and/or personal ID card according to the present invention bears full-color external text and/or graphics, including a unique two-or three-dimensional barcode applied by an image transfer printed by a modified large-format digital printer. The transfer is applied by a selective release transfer process in which the adhesive layer attaches only in the image area to the target surface and the adhesive layer is peeled off except for the image area which is left attached to the target surface. This produces a high-resolution four color graphic inclusive of white, which is used to apply the three-dimensional barcodes at potential volumes of upward of 200,000 per day. It is envisioned that the USB business and/or personal ID card may contain any combination of: the name or logo of the company; office address, individual name, telephone numbers, fax, and email address. The opposite side of the card could contain pertinent information concerning its use or other promotion materials. This card could be used as an identity card, driver license, insurance card, financial services card, credit card, prescription drug cards, Medicaid card, and Internet transaction card. The outside of the card could contain: a bar code, including 2 and 3 dimensional codes; a photograph; and other biometric information that can be printed on the outside of the card.

The present invention therefore includes the digitally-printed transfer bearing a digitally created image that can be heat and/or pressure-applied to a target surface, and a method for transferring the digitally created images from film to a target surface via digital printing and heat and/or pressure transfer or printed directly on the card using conventional ink jet technologies. The heat transfer process employs a modified digital printer (converted from a double sided fusing printing process to a back fusing web printing process) to create an image on transfer film subsequently coated with adhesive that is then heat and/or pressure-applied to a substrate to yield a high-resolution four color graphic with white.

The basic fabrication steps comprise 1) coating one side of a disposable base transfer film (or carrier) with a releasable coating; 2) digitally printing one or more images overtop the base transfer film in reverse-image format; and 3) applying an adhesive coating over the image.

The result is a roll of pre-printed transfers. In accordance with the present method for transferring the digitally created images from film to a target surface, 4) the base transfer film is indexed over a target substrate (image down and showing through the film) and heat and/or pressure is applied to the base transfer film to adhere the image to the target substrate. The base transfer film is peeled from the target substrate and is discarded, leaving a high-resolution color graphic image on the target substrate.

The method is described in detail below with various options, and in all cases the method is unique because when the image is transferred there is "selective release", meaning that there is transfer to the target substrate only in a pre-determined area (most commonly in the specific area of the print image, though for some applications it may be desirable to have a release that includes non-imaged areas), despite the adhesive coating which may, and indeed, usually exceeds the borders of the printed image. This selective release improves the quality of the transfer because there are no unsightly borders or margins around the image, and holes and gaps in fairly complex images are not filled in.

Figure 15:
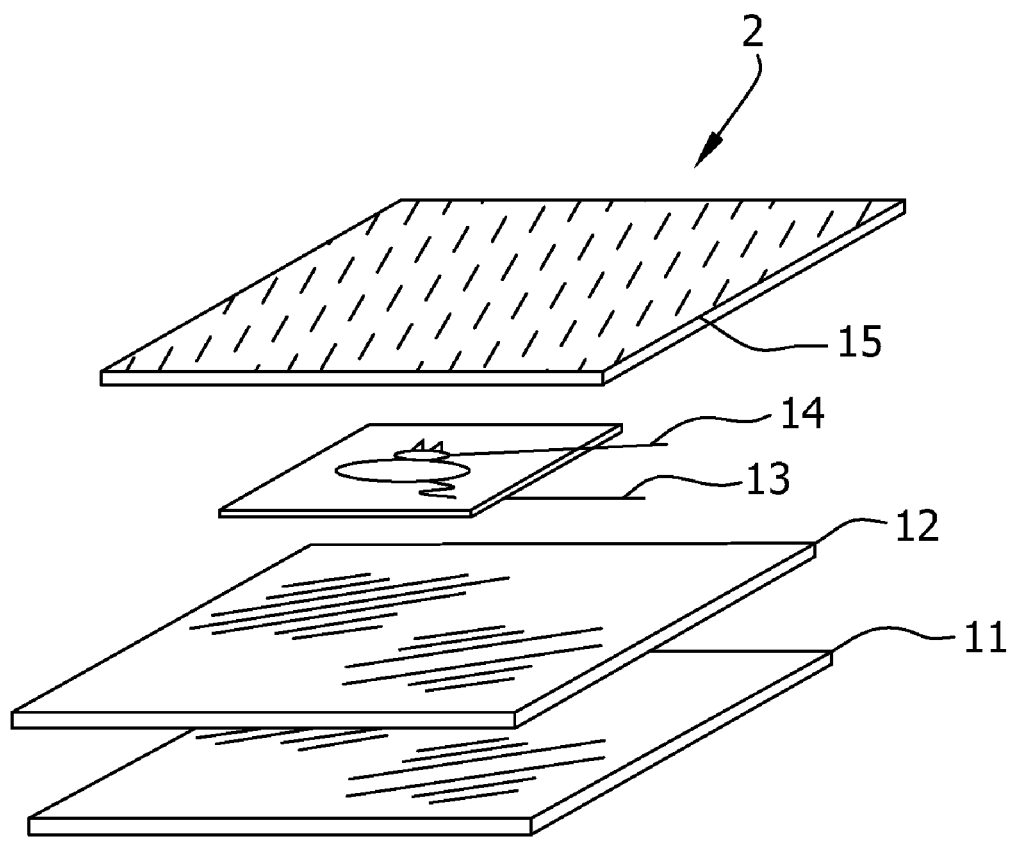
FIG. 15 is an exploded diagram showing the layers of an exemplary image transfer according to the present invention.

FIG. 15 is an exploded diagram showing the layers of an exemplary image transfer 2 according to the present invention. The image transfer 2 includes a disposable base transfer film 11. This can be any suitable transfer carrier formed of plastic or non-woven material and that is capable of being passed as a web through the production machinery. For example, the presently preferred transfer film 11 is polyester teraphthalate (PET). In accordance with one optional feature of the present invention, the transfer film 11 may be pre-formed with distinct surface patterns or texture to give the final transfer a textured aesthetic.

An image release layer 12 is uniformly applied onto the base transfer film 11. Image release layer 12 may be, for example, a wax, lacquer, or combination of wax and lacquer, with or without specific additives. The application of the image release layer 12 may be attained by applying the wax and/or lacquer onto the base transfer film 11 in individual coats from either solvent or waterborne solutions or suspensions. It is known from experience that the final parameters of the coating can be adapted to any requirement by the changing coating weights, the addition or substitution of resins, waxes and wax solutions, and there are many conventional coating methods that can be used to achieving a desired coat weight. The appearance of the final coating can be full gloss or be matted down to the required level by the addition of matting agents. When applied the release layer 12 must be uniform, and free from all coating defects and application patterns (except where a coating pattern is an intended aspect). The presently-preferred release layer 12 comprises a lacquer mixture of commercially available polymethyl methacrylate resin with a commercially available wax suspension (BYK 151 ex-Samual Banner). The ratio of resin to wax is on the order of 80% to 95% resin to 5% to 20% wax. These two components are provided in a 5% to 15% solid solution (depending on method of application) in a butanone and toluene solvent blend (of which toluene is around 10% of the total solvent). The release layer coating is then forced air-dried giving a dry coat weight coat weight of 1.15 to 1.35 grams per square meter.

The image 13 itself is then digitally printed with a four color graphic (as will be described) on the transfer film 11 (overtop release layer 12). The digital printer may employ either electro-ink or dry powder toner, and otherwise conventional print techniques. Preferably, a registration mark is printed at this same time, and when desired the four-color image 13 (and registration mark) is then overprinted with a white background 14.

Finally, a pressure and/or heat activated adhesive layer 15 may be applied evenly over the whole of the web, both where there is image and no image, or may be selectively applied only in the image area. Presently, the adhesive layer 15 is applied in line directly after the printing step using a 3.5% to 4% solution of commercially available polyamide (Lioseal V 7036 ex-Flenkel) in a solvent system, which is predominately Isopropyl alcohol. This solution is then coated onto the image 13 and/or transfer film 11 by a wire wound rod at a dry coating weight of 0.2 to 0.3 grams per square meter, the applied coating being forced air-dried.

To then transfer the digitally created image from the transfer film 11 to a target surface, the base transfer film 11 is placed on a target substrate and is indexed in position using the index lines (image down and showing through the film). The adhesive layer is then heat and/or pressure-fused to a subject material and the image itself 13 adheres more strongly to the material than does the image release layer 12. Thus, when the image transfer film 11 is applied image-down to a target substrate by application of pressure and/or heat (as will be described), the dried adhesive layer 15 attaches to the target substrate only in the image 12 area but is otherwise retained by the transfer film 11 ("selective release"). To then apply the transfer 2, the image transfer film 11 is peeled off the target substrate together with the dried adhesive layer 15 except for the image area which is left attached to the target substrate by the pressure and/or heat activated adhesive layer 15. For this to happen, the thickness of the non-printed areas of release layer 12 and adhesive layer 15 must be thinner than printed areas containing the release layer 12, image 13 and adhesive layer 15 such that more pressure is exerted where there is image to the target substrate than where there is no image. The characteristics of the image release layer 12, the adhesive layer 15 and the image layers 13, 14 are selected so as to work with a wide variety of target substrates, including textured and porous materials such as leather to give this selectivity.

Figure 16:
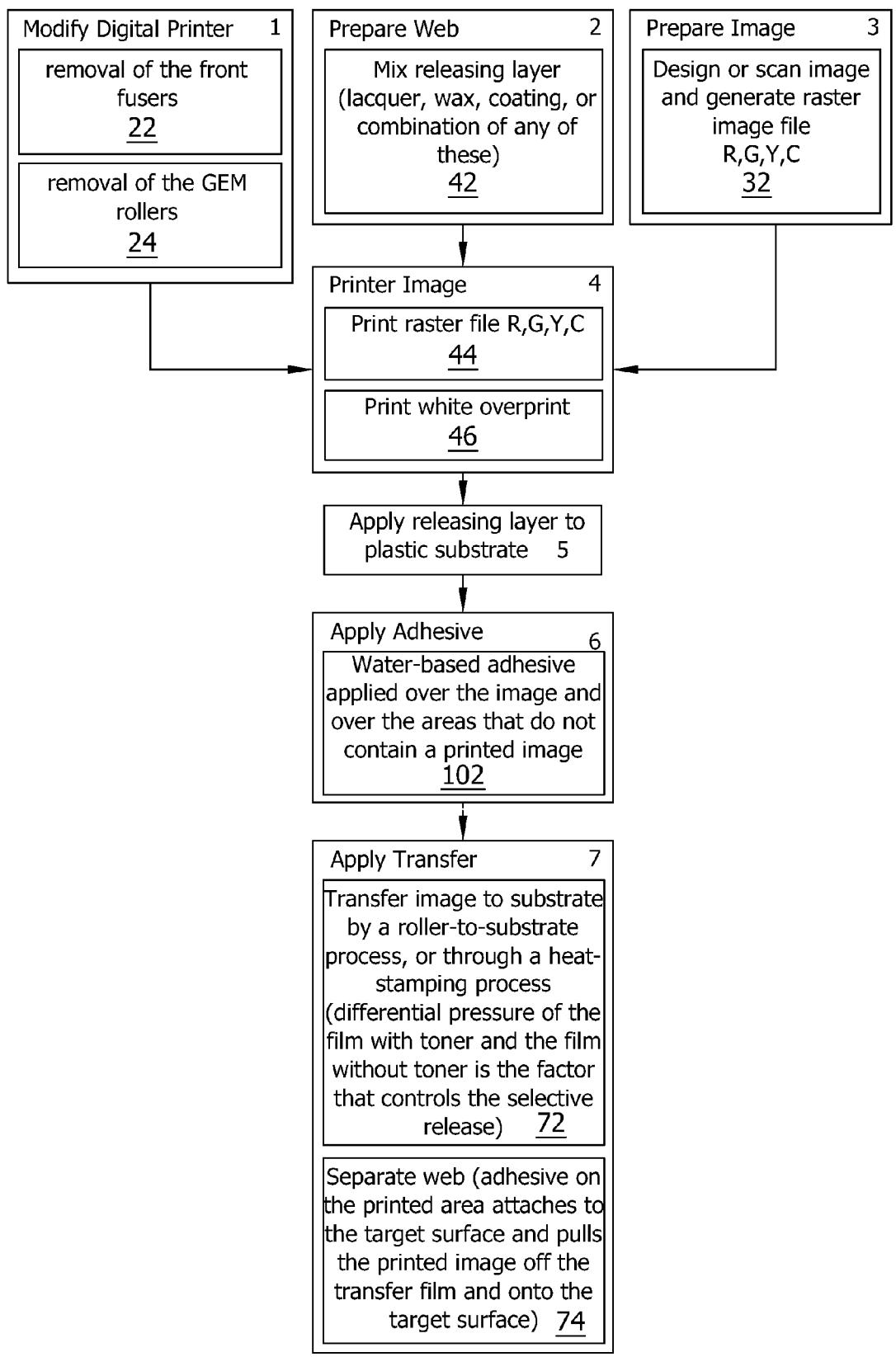
FIG. 16 is a block diagram of the process steps for making and applying the above-described transfer.

FIG. 16 is a block diagram of all necessary process steps for making and applying the above-described transfer 2.

Step 1: Modify Digital Printer

Figure 17:
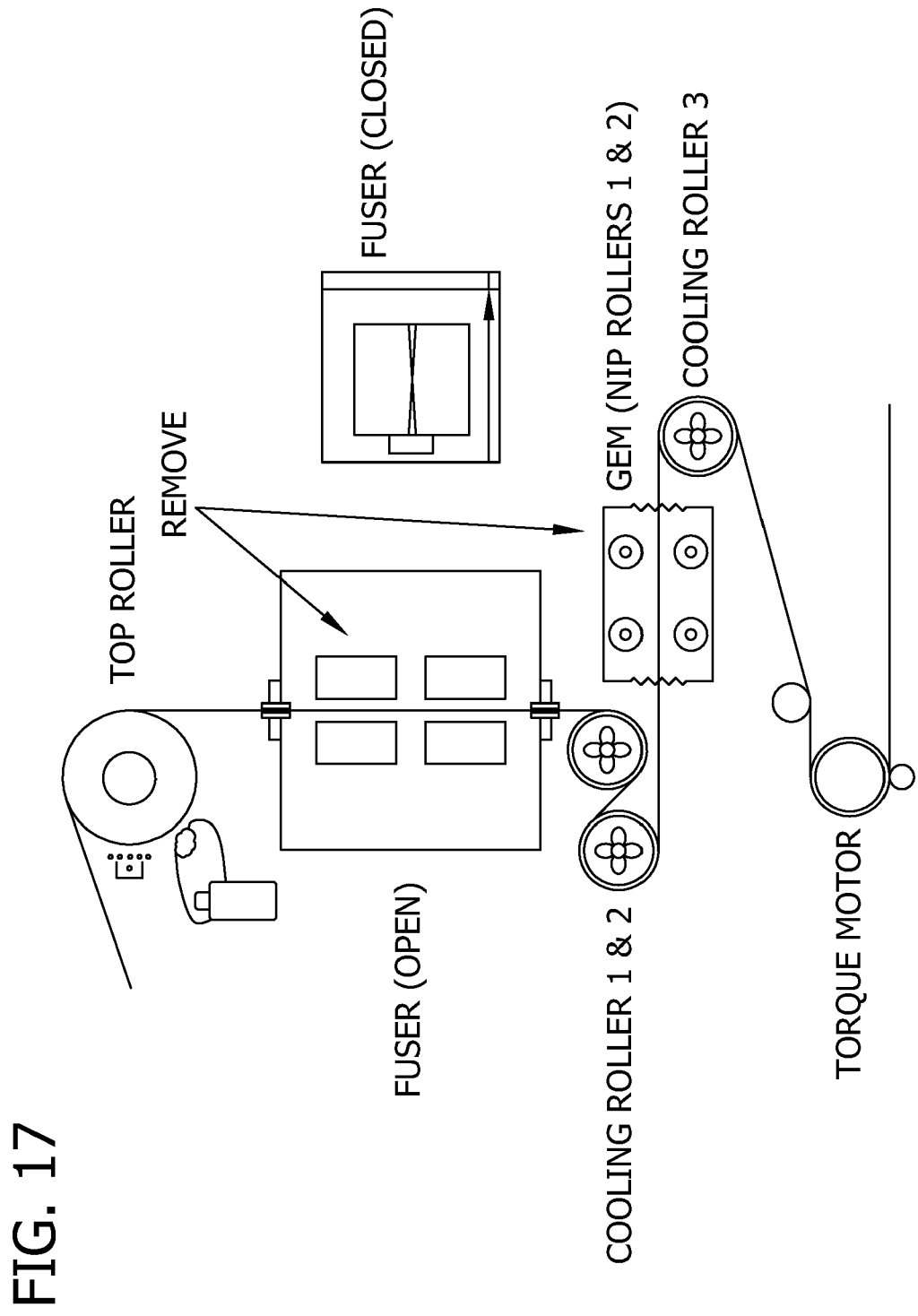
FIG. 17 is a diagram of the components of an exemplary digital printer that are removed as per the necessary modification of the present invention.

This printer can be any conventional digital printer that uses either ElectroInk™ or dry powder toner, or other conventional print techniques. For example, a Xeikon™ large format digital printer is suitable. This and most other large format digital printers employ heater roller assemblies and fusers generally contained within a protective housing. A toner image is transferred to a sheet or web and is then fixed to the web by heat and/or pressure. Typically the paper is transported in a nip between the fuser and pressure roller, which are rotating. Thermal radiation from a lamp heats the fuser roller, causing the toner on the web to melt and press into the web fibers. In accordance with the present invention, the printer is modified to essentially convert it from a front and back fuser system to a back fusing web printing process. The modification initially entails disabling the heaters in the infeed module removal of the front fusers (substep 22) and removal of the GEM rollers 24. Specifically, for a Xeikon digital printer, the front fusers and part nos. CNS-1262-015208 32D (Gem Roller) would be removed as seen in FIG. 17. In addition, the print color order is changed from the conventional CMYK to KMCY Step 2: Prepare Web The current process uses a plastic web in roll form for the base transfer film 11 of FIG. 15 and pre-coats this with the release layer 12 which may be a releasing lacquer, a wax, a release coating, or a combination of any of these as described above. At substep 42 it is necessary to mix the releasing layer (lacquer, wax, coating, or combination of any of these). The lacquer, wax and release coating are custom-mixed to create the correct release factor for a range of heat and pressure used. A suitable wax release can be mixed with a combined acrylic nitrocellulose overlacquer for this purpose.

If desired, the release layer 12 may be texturized or mixed with specific additives, such as ultraviolet absorbers or biocides, to give the release layer specific properties.

For example, the release layer 12 may be texturized with a distinct carrier surface pattern (matte or scratch). Since the image is printed onto the release layer 12 and is then transferred, the net effect is to impart the surface pattern onto the surface of the transfer. Most any texture or pattern that can be made to the surface of the release layer 12, for example, embossing, etching or addition of a solid component, e.g. silica. In each ease this is transferred when it is applied to the target substrate. These changes can be aesthetic for example, matte, brushed effect, geometric pattern, regular pattern or random pattern. The effect can also be subtle such as wording, images or patterns that are only visible with light shining on the surface at a particular angle, thereby serving as a simple security device.

As another example, the release layer 12 may contain a functional additive that confers a property to the transfer 2 that is not present in the transfer without the additive. For example the addition of 1% of an anti-microbial additive such the transfer surface as applied to a target will inhibit bacteria. Inorganic, silver-based antimicrobials are generally recognized as safe and are well suited for this purpose.

The addition of a small percentage (less than 10%) of a UV absorber will protect the toner image from degradation in color intensity due to prolonged exposure to direct sunlight.

The addition of a phosphorescent or fluorescent additive will make the transfer "glow" when UV light is shined onto it. This addition can be used in conjunction with the above-described surface pattern, making the effect easier to detect.

Step 3: Prepare Image

The image is designed into a vector image file, or scanned into a raster image file, in both cases using four color CMYK pixilation.

As seen at substep 32, the emblem graphic design may be generated using computer drawing software. This is generally accomplished using graphics programs such as well-known Adobe Illustrator™, Photoshop™, etc. Such software is capable of calculating the image dimensions from the design, and colors are chosen from a selectable palette. Photoshop software developed by Adobe uses a palette technique in which the image data is coded and compressed to a prescribed number of colors (a range of from 256 to 16M colors depending on the selected palette). The image file can be manipulated as desired to resize/rescale, redraw or alter the coloration. The final image is then saved as a CMYK raster image file.

Step 4: Print Image

Given a prepared image, at substep 44 the image is printed directly from the raster image file and at substep 46 an additional toner drum of white toner (W) is used to print a white overprint. The process imprints electrostatically charged toner or inkjet images onto the base transfer film 11. The process prints the desired image, laying on colors in registration patterns in the order Black, Magenta, Cyan, Yellow (KMCY), and finally White, instead of the CMYK patterns that are applied by an unmodified Xeikon. The printing of a white layer of color at substep 66 is unique to the invention and this improves contrast by filling in blank areas. When working on the design computer white is seen as black. White cannot be seen on the screen. The black image (the part we want to be white) is given a specific reference, for example, pantone 100. This specific reference number is added as a fifth color that the Xeikon combines with the normal CMYK colors of the design, and yet printing this reference color as white as it has been programmed to do.

Step 5: Apply Release Layer

Next, at step 5, the mixed release layer 12 is applied to the plastic transfer film 11. The release layer 12 is applied over the whole surface of the base transfer film 11 using conventional coating machine.

Step 6: Apply Adhesive

At step 6 a water or solvent based adhesive is applied over both the image (with nor without white) and the areas that do not contain a printed image. These areas may include parts of the image that have intentionally been left clear of print for example between numbers, backgrounds to let the substrate be seen through the print, etc. The transfer 2 is now complete.

Step 7: Apply finished Transfer 2

Finally, at step 7, the image transfer 2 may be applied to a wide variety of materials including rough and/or porous materials such as leather. At substep 72 the image 13 may be transferred to the substrate material by a roller-to-substrate process, or through a heat-stamping process, in both cases using conventional presses. In both cases the differential pressure of the transfer film 11 with toner versus the transfer film 11 without toner is the factor that controls the selective release according to the present invention. More specifically, at substep 74 the dried adhesive on the printed area of the image 13 encounters more pressure due to the additional thickness added by the toner, and thus the printed areas of image 13 attach to the target material. After the transfer film 11 contacts the target substrate, the transfer film 11 may be peeled away. The printed image 13 transfers to the target substrate as the web separates. The adhesive on the printed area attaches to the target surface and pulls the printed image off the transfer film 11 and onto the target substrate. The process does not leave a "lacquer halo" around the printed images as in conventional transfer processes.

Where a heat-stamping process is used, the stamping press may be used a second time directly onto the transferred image to imbed the printed image into the selected substrate.

This differential pressure is obtained by the difference in thickness between the areas of the film that are imprinted with the image 13 and areas where there is no image. Although it is imperceptible to the naked eye, the transfer 2 is thicker in the areas where the toner has been applied. The image is transferred selectively through the interaction of the release layer, image and adhesive and the target substrate. The release layer and adhesives being specifically formulated to exploit this differential pressure.

The invention has generally been described for use in security of an information system. The invention can be used for other applications, for example: version control; archiving and destruction; monitoring and gathering usage metrics of various components of an information system; indexing and retrieving files; valuation; resource allocation; and ownership management.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A secure card comprising:
   a front surface;
   a back surface;
   a memory operably placed between said surfaces, said memory comprising an interface to an external device;
   a removable image transfer film comprising a releasable coating disbursed thereon;
   a digitally created image originally applied to said releasable coating in reverse image format; and
   an adhesive layer operable such that said digitally created image is between the releasable coating and said adhesive layer, said adhesive layer applied adjacent one or more target surfaces associated with one of said surfaces, a selective release transfer process utilized such that only the portions of said adhesive layer adjacent said digitally created image remain on the one of said surfaces when said image transfer film is removed from said card.

2. The secure card according to claim 1 wherein portions of said adhesive layer not subjected to the selective release transfer process are peeled away from said surfaces when said image transfer film is removed from said card.

3. The secure card according to claim 1 wherein said adhesive layer is attached to said digitally created image prior to attachment of said adhesive layer to said surfaces.

4. The secure card according to claim 3 wherein said digitally created image is created on the image transfer film which is subsequently coated with an adhesive to form said adhesive layer.

5. The secure card according to claim 4 wherein said adhesive layer is applied to said surfaces utilizing at least one of a heat transfer process and a pressure transfer process.

6. The secure card according to claim 1 wherein said digitally created image comprises at least one of:
 a two-dimensional bar code;
 a three-dimensional bar code;
 a photograph; and
 biometric information.

7. The secure card according to claim 1 wherein said image transfer film includes preformed surface patterns thereon resulting in a texture on one of said surfaces of said card.

8. The secure card according to claim 1 wherein the selective release transfer process causes portions of said adhesive layer in addition to the portions that are adjacent said digitally created image to remain on said surfaces when said image transfer film is removed from said card.

9. The secure card according to claim 1 wherein said image transfer film comprises one of a plastic material and a nonwoven material capable of being passed as a web through production machinery.

10. The secure card according to claim 1 wherein said image transfer film comprises polyester teraphthalate.

11. The secure card according to claim 1 wherein said releasable coating comprises at least one of a resin, a wax and a lacquer applied onto said image transfer film in individual coats from one of solvents, waterborne solutions, and suspensions.

12. The secure card according to claim 1 wherein said digitally created image is printed using one of electro-ink and dry powder toner.

13. A method for applying images to transaction-type cards, said method comprising:
 coating one side of a disposable base transfer film with a releasable coating;
 digitally printing one or more images onto the base transfer film in reverse-image format;
 applying an adhesive coating over the base transfer film, including over the one or more images;
 indexing the base transfer film over one of the transaction-type cards;
 applying at least one of pressure and heat to the base transfer film to adhere portions of the adhesive, including the portions adjacent the one or more images, to the transaction-type cards; and
 peeling the base transfer film from the one transaction-type card leaving the one or more images on a surface of the card such that only portions of the adhesive coating adjacent the one or more images remain on the surface of the one transaction-type card when the base transfer film is removed from the one transaction-type card.

14. The method according to claim 13 wherein applying at least one of pressure and heat to the base transfer film comprises applying at least one of pressure and heat in selected areas of the base transfer film such that only a portion of the adhesive coating adheres to the transaction-type card.

15. The method according to claim 14 wherein applying at least one of pressure and heat in selected areas of the base transfer film comprises not applying pressure and heat in holes and gaps associated with complex images.

16. The method according to claim 13 wherein digitally printing one or more images comprises printing the one or more images using one of electro-ink and dry powder toner.

17. The method according to claim 13 wherein coating one side of a disposable base transfer film with a releasable coating comprises at least one of applying a texture to the release layer and embedding a pattern within the release layer.

18. The method according to claim 13 wherein coating one side of a disposable base transfer film with a releasable coating comprises at least one of:
 adding an anti-microbial additive to the release layer;
 adding an ultraviolet absorber to the release layer; and
 adding at least one of a phosphorescent and fluorescent additive to the release layer.

19. The method according to claim 13 wherein digitally printing one or more images onto the base transfer film comprises:
 printing the image onto the base transfer film directly from a raster image file; and
 printing a white overprint over the printed image.

20. The method according to claim 13 wherein digitally printing one or more images onto the base transfer film comprises printing the image on the base transfer film in registration patterns in the order black, magenta, cyan, yellow, and white.

21. A method for preparing a transfer film comprising:
 coating a plastic web in roll form with a release layer that includes at least one of a releasing lacquer, a wax, and a release coating custom mixed to create a correct release factor;
 creating a digital image file in a CMYK raster image file using computer drawing software;
 printing the image onto the release layer, laying on colors in registration patterns in the order black, magenta, cyan, yellow, and white to create a reverse image;
 applying an adhesive over both the reverse image and the areas of the release layer that do not contain the image resulting in a transfer;
 applying the transfer to a surface; and
 causing the image to transfer from the plastic web to the surface using a selective release process such that only portions of the adhesive adjacent the image remain on the surface when the release layer is removed from the surface.

22. A method according to claim 21 further comprising converting a printer from a front and back fuser system to a back fusing web printing process.

23. A method according to claim 21 wherein coating a plastic web in roll form with a release layer comprises at least one of:
 adding a texture to the release layer;
 adding a solid component to the release layer;
 adding an anti-microbial additive to the release layer;
 adding an ultraviolet absorber to the release layer; and
 adding at least one of a phosphorescent and fluorescent additive to the release layer.

24. A secure card comprising:
 a front surface;
 a back surface;
 a memory operably placed between said surfaces, said memory comprising an interface to an external device; and
 a digitally created image originally applied to a releasable coating in reverse image format, the releasable coating disbursed upon a removable image transfer film and adhered to one of said surfaces using a selective release transfer process such that only portions of an adhesive layer adjacent said digitally created image remain on said one of said surfaces when said image transfer film is removed from said one of said surfaces.

* * * * *